(12) United States Patent
Maeda

(10) Patent No.: US 9,784,641 B2
(45) Date of Patent: Oct. 10, 2017

(54) LENS ARRAY, WAVEFRONT SENSOR, WAVEFRONT MEASUREMENT APPARATUS, SHAPE MEASUREMENT APPARATUS, ABERRATION MEASUREMENT APPARATUS, MANUFACTURING METHOD OF OPTICAL ELEMENT, AND MANUFACTURING METHOD OF OPTICAL DEVICE

(71) Applicant: CANON KABUSHIKI KAISHA, Tokyo (JP)

(72) Inventor: Atsushi Maeda, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/242,068

(22) Filed: Aug. 19, 2016

(65) Prior Publication Data

US 2017/0059446 A1    Mar. 2, 2017

(30) Foreign Application Priority Data

Aug. 26, 2015    (JP) ................................. 2015-166393

(51) Int. Cl.
| | |
|---|---|
| *G01B 9/00* | (2006.01) |
| *G01M 11/02* | (2006.01) |
| *G02B 3/00* | (2006.01) |
| *G02B 5/20* | (2006.01) |
| *H04N 5/225* | (2006.01) |

(52) U.S. Cl.
CPC ......... *G01M 11/025* (2013.01); *G02B 3/0056* (2013.01); *G02B 5/205* (2013.01); *H04N 5/2254* (2013.01)

(58) Field of Classification Search
CPC ... G01M 11/025; G02B 3/0056; G02B 5/205; H04N 5/2254; G01B 11/24
USPC .................................................. 356/121–137
See application file for complete search history.

(56) References Cited

FOREIGN PATENT DOCUMENTS

JP            2013-2819 A      1/2013

OTHER PUBLICATIONS

Macleod, H.A., "Thin-Film Optical Filters, Fourth Edition", CRC Press, 2010, pp. 52-61.
Introduction to Fourier Optics; Chapter 3: Foundations of Scalar Diffraction Theory, 1996,P pp. 55-58.

*Primary Examiner* — Tri T Ton
(74) *Attorney, Agent, or Firm* — Canon USA Inc., IP Division

(57) ABSTRACT

A lens array includes a plurality of lenses that collect divided test light and form spots. Each lens includes a lens member, and a light shielding mask provided concentric to the lens member along a perimeter edge thereof, the light shielding mask shielding a part of the light and transmitting a part of the light. The light shielding mask is formed to satisfy a predetermined mathematical condition of light transmission.

20 Claims, 16 Drawing Sheets

LENS ARRAY, WAVEFRONT SENSOR, WAVEFRONT MEASUREMENT APPARATUS, SHAPE MEASUREMENT APPARATUS, ABERRATION MEASUREMENT APPARATUS, MANUFACTURING METHOD OF OPTICAL ELEMENT, AND MANUFACTURING METHOD OF OPTICAL DEVICE

BACKGROUND OF THE INVENTION

Field of the Invention

The present invention relates to a light shielding member provided to a lens in a lens array.

Description of Related Art

Aspherical optical elements (mirrors, lenses, etc.) are commonly used to reduce the size of optical systems included in optical devices, such as cameras, optical drives, semiconductor exposure devices, and the like. Efficient production of high-quality aspherical optical elements requires measurement technology of high accuracy to easily evaluate the shape of aspherical optical elements.

A well-known example of such measurement technology is a measurement instrument that uses a Shack Hartmann wavefront sensor (SHWS) having a microlens array (MLA) and an optical detector. When light cast onto an object to be tested such as an aspherical lens or the like is reflected, that light is propagated as modulated light with a wavefront having the shape of the object to be tested. The modulated light with a wavefront having the shape of the object to be tested is referred to, hereinafter, as "test light". Detecting the test light using the SHWS enables wavefront measurement, and consequently the shape of the object to be tested can be measured from the wavefront measurement data.

When the test light enters the MLA of the SHWS, multiple spots are formed on the imaging surface of the optical detector. The spots are imaged, and the positions of the spots are each detected. The incident angle of the beam entering the microlenses is calculated from the detected spot positions, and data of the wavefront of the test light can be calculated from the incident angle distribution of the beam of test light.

In order to increase (improve) the measurement resolution of the SHWS, the pitch of the microlenses making up the MLA needs to be narrowed. However, light incident on the microlenses generates diffracted light owing to the perimeter edge portions of the microlenses. Accordingly, narrowing the pitch results in the electric field of the diffracted light generated at adjacent microlenses to interfere with the electric field of the spots, creating interference fringes. This distorts the spot images, and the wavefront measurement precision deteriorates. Accordingly, diffracted light nearby the spots that adjacent microlenses form needs to be suppressed, in order to realize both high resolution and high precision measurement of the SHWS. Japanese Patent Application Laid-Open No. 2013-2819 discloses SHWS technology where aperture members are added to each microlens of the MLA. In this case, the light transmittance of the aperture members decreases in stages toward the perimeter edge portions, starting at 100%, and then decreasing to 60%, and then 30%.

However, the aperture members described in Japanese Patent Application Laid-Open No. 2013-2819 has not been capable to sufficiently suppress diffracted light from interfering with spots generated by adjacent lenses. As a result, distortion of light spots formed by the lenses has not been able to be sufficiently suppressed, and sufficient wavefront measurement precision has yet not been obtained.

Therefore, it continues to be desirable to effectively suppress distortion in light spots formed by diffracted light of adjacent lenses of an MLA of a SHWS.

SUMMARY OF THE INVENTION

A lens array includes a plurality of lenses configured to form a plurality of light spots by collecting test light that has been modulated by a test object. Each lens has a lens member, and a light shielding member provided corresponding to an inner region of the lens member including a perimeter edge portion thereof; the light shielding member shielding a part of the light and transmitting a part of the light. The light shielding member is formed to satisfy the following expression $$\left| \frac{\Delta_1 + \sum_{j=2}^{N} \Delta_j \exp\left(i\frac{2\pi p}{\lambda f}\delta_j\right)}{\sum_{j=1}^{N} \Delta_j} \right| \leq 0.5$$

where p represents a layout pitch of the lenses, λ represents a wavelength of the test light, f represents a focal length of the lenses, i represents an imaginary unit, N is an integer equal to or larger than 2, j is an integer from 2 to N, and $\Delta_1$ is an absolute value of an electric field transmission coefficient at the perimeter edge portion of each lens. In each lens, the absolute value of the electric field transmission coefficient $\Delta_1$ increases in a stepped manner from the perimeter edge portion toward the inner side thereof by an amount of change $\Delta_j$, at a position that is a distance $\delta_j$ inwards from the perimeter edge portion.

Further features of the present invention will become apparent from the following description of exemplary embodiments with reference to the attached drawings.

According to the present invention, distortion in light spots by diffracted light can be effectively suppressed.

BRIEF DESCRIPTION OF THE DRAWINGS

FIG. 2A is a frontal view and FIG. 2B is a cross-sectional view of the lens array.

FIG. 3B is an enlarged view of the vertical axis in FIG. 3A.

FIG. 6A shows the transmittance T and FIG. 6B shows the absolute value t of electric field transmission coefficient.

FIG. 17A is a frontal view and FIG. 17B is a cross-sectional view of the lens array.

DESCRIPTION OF THE EMBODIMENTS

Embodiments for carrying out the present invention will be described in detail with reference to the drawings.

First Embodiment

Wavefront Measurement Apparatus

Figure 1:
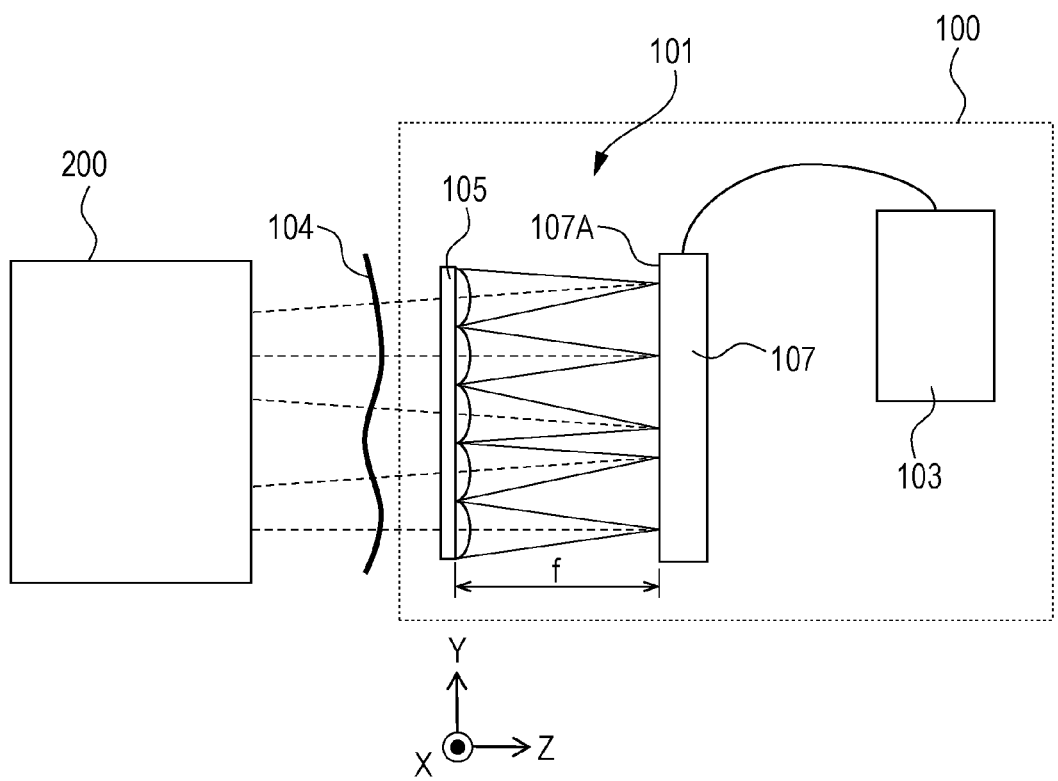
FIG. 1 is a schematic diagram illustrating a wavefront measurement apparatus according to a first embodiment.

FIG. 1 is a schematic diagram illustrating a wavefront measurement apparatus according to a first embodiment of the present invention. The wavefront measurement apparatus 100 measures a wavefront 104 of emitted light (test light) from an optical device 200 having an optical element, via an optical system (omitted from illustration). The wavefront measurement apparatus 100 includes a Shack Hartmann wavefront sensor (SHWS) 101 serving as a wavefront sensor, and a computing device 103 serving as a computing unit. The SHWS 101 includes a microlens array (MLA) 105 that is a lens array, and an imaging device 107.

Figure 2A:
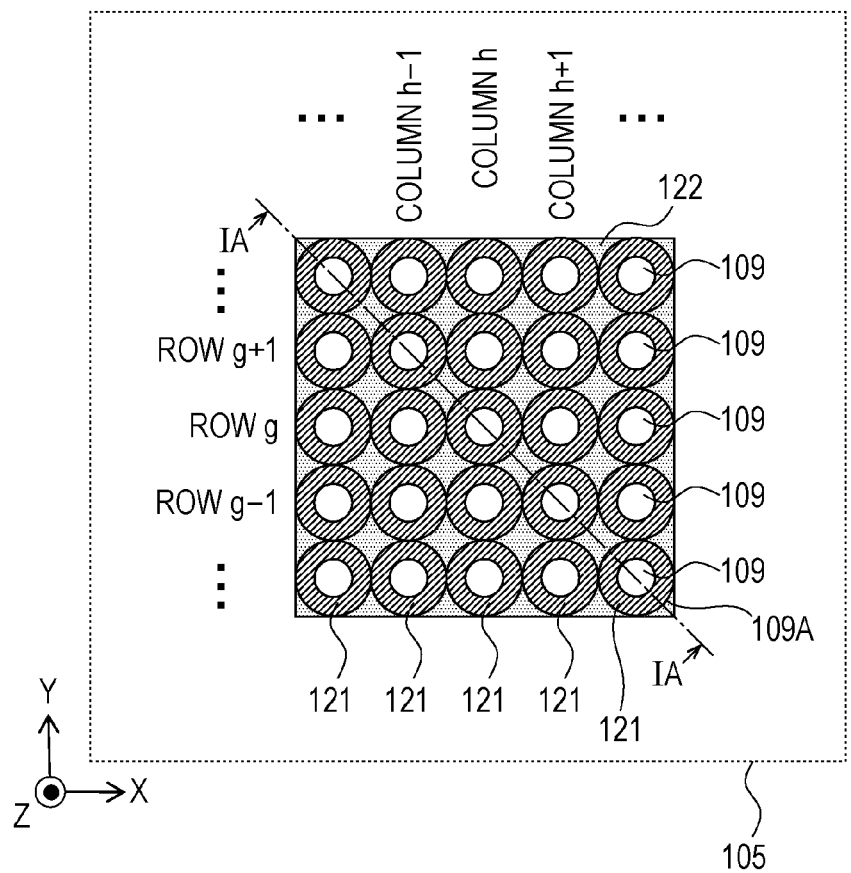
FIGS. 2A and 2B are diagrams of a lens array according to the first embodiment, where
Figure 2B:
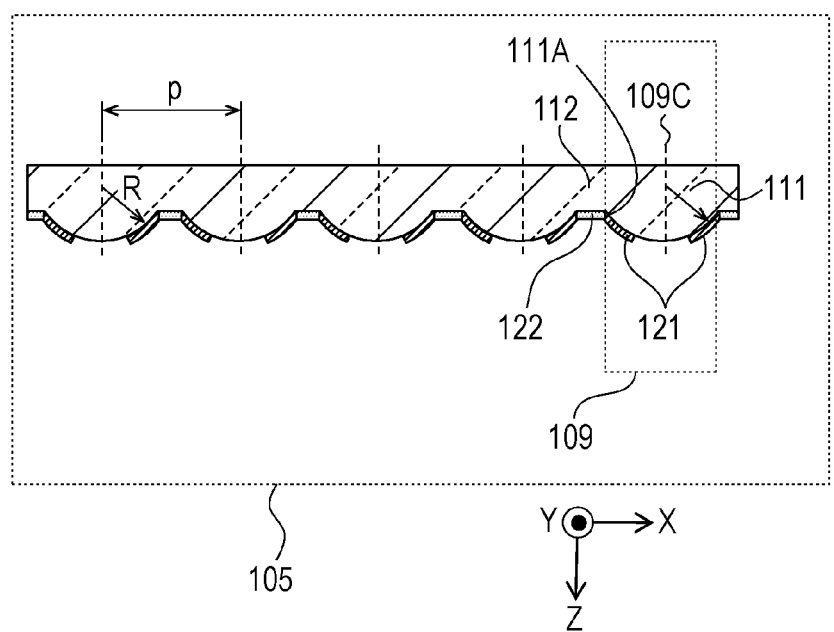

FIGS. 2A and 2B are diagrams of the MLA 105 according to the first embodiment, where FIG. 2A is a frontal view and FIG. 2B is a cross-sectional view along line IA-1A of FIG. 2A. The MLA 105 has multiple microlenses (lenses) 109 that collect divided test light and form multiple light spots. That is, each the microlenses 109 of MLA 105 focus the test light onto the imaging device 107 at a different point to form the multiple light spots. The multiple lenses 109 form an array of rows and columns which are arrayed equidistantly (square array) in an X-Y plane illustrated in FIG. 2A.

Each lens 109 has a lens member (lens element) 111 that is formed from a transparent material, and a light shielding mask 121 that is a light shielding member provided corresponding to the lens member 111, as illustrated in FIG. 2B. The light shielding mask 121 is provided along with the lens face on the lens member 111 on the emitting side of the lens member 111, i.e., on the side of the lens member 111 through which light has passed through.

The MLA 105 also has connecting members (lens connecting portions) 112 connecting the multiple lens members 111, and light shielding connecting portions 122 provided corresponding to the connecting members 112. The connecting members 112 also are formed from a transparent material, as are the lens members 111. That is to say, the multiple lens members 111 and the connecting members 112 are integrally formed. The light shielding connecting portions 122 are disposed in correspondence with the connecting members 112, on the light emitting side of the MLA.

The optical axis 109C of the lenses 109 is disposed parallel to the Z direction. The perimeter edge portions 109A of the lenses 109 (perimeter edge portions 111A of lens members 111) are circular, having a radius R centered on the optical axis 109C. The symbol f represents the focal length of the lenses 109. The multiple lenses 109 are arrayed equidistantly in a square array at a layout pitch p in the first embodiment. That is to say, the distance between the optical axes 109C of two adjacent lenses 109 is the pitch p. Note that the array of the lenses 109 is not restricted to that illustrated here, and may be other arrays such as a hexagonal grid or the like. Further, although an arrangement is illustrated in FIG. 2A where 5×5 lenses 109 are arrayed, the number of lenses arrayed is not restricted to this.

The imaging device 107 is an area sensor such as a charge-coupled device (CCD) image sensor, a complementary metal-oxide semiconductor (CMOS) image sensor, or the like. The imaging device 107 is disposed facing the MLA 105, and images a spot image made up of multiple spots formed by the multiple lenses 109 of the MLA 105. The MLA 105 is positioned approximately parallel (including parallel) to a light-receiving surface 107A of the imaging device 107, at a position which is approximately the focal length (including the focal length) f away from the light-receiving surface 107A.

The computing device 103 calculates data (wavefront data) of the wavefront 104 of the test light, based on the detection results of the SHWS 101. More particularly, the computing device 103 calculates wavefront data of the test light acquired by imaging the spot image by the imaging device 107.

The light shielding connecting portions 122 are formed covering the connecting members 112 to shield the test light entering the connecting members 112. The light shielding masks 121 are circular aperture masks having a radius R, with the center of the apertures being concentric with the optical axes 109C of the lenses 109. Light passing through the light shielding connecting portion 122 is small enough to be negligible. The optical density of the light shielding masks 121 preferably is 3 or more, which is 0.001 or lower in terms of light transmittance. An example where the light shielding masks 121 and the light shielding connecting portions 122 are formed of a chromium (Cr) film will be described in the first embodiment, but other metal films, or materials other than metal, may be used if the above condition is met.

Although FIG. 2B illustrates an example where the connecting members 112 are parallel plates, the connecting members 112 may include sphere forms that are extrapolations of the lens faces of the lenses 109. The presence of the light shielding connecting portions 122 prevents the connecting members 112 from functioning as lenses in this case. The perimeter edge portions 109A of the lenses 109 are defined by the light circular openings of the light shielding masks 121, whereby the radius of the lenses 109 agrees with the radius R of the circular apertures of the light shielding masks 121.

A comparative example will be described here regarding a case where the lenses 109 have no light shielding mask and are configured only of the transparent lens member 111, with the light transmittance thereof being uniform over the entire face, i.e., a case where the lenses 109 are transparent. In a case where light having a planar wavefront perpendicularly enters a lens 109, the complex amplitude of the electric field (hereinafter referred to simply as "electric field") $E'_0(r)$ at the focal plane at a position that is a distance r from the optical axis 109C of the lens 109 is approximated as shown in Expression (1) by Fresnel diffraction equation, $$E'_0(r) \approx \frac{2E_0 R}{r} J_1\left(\frac{2\pi R r}{\lambda f}\right) \quad \text{Expression (1)}$$

where $E_0$ represents the intensity of the electric field of light incident on the lens 109, $\lambda$ represents the wavelength of the light, and $J_1(x)$ represents a primary Bessel function (see Tadao Tsuruta, "Applied Optics I", Baifukan, 1990).

Figure 3A:
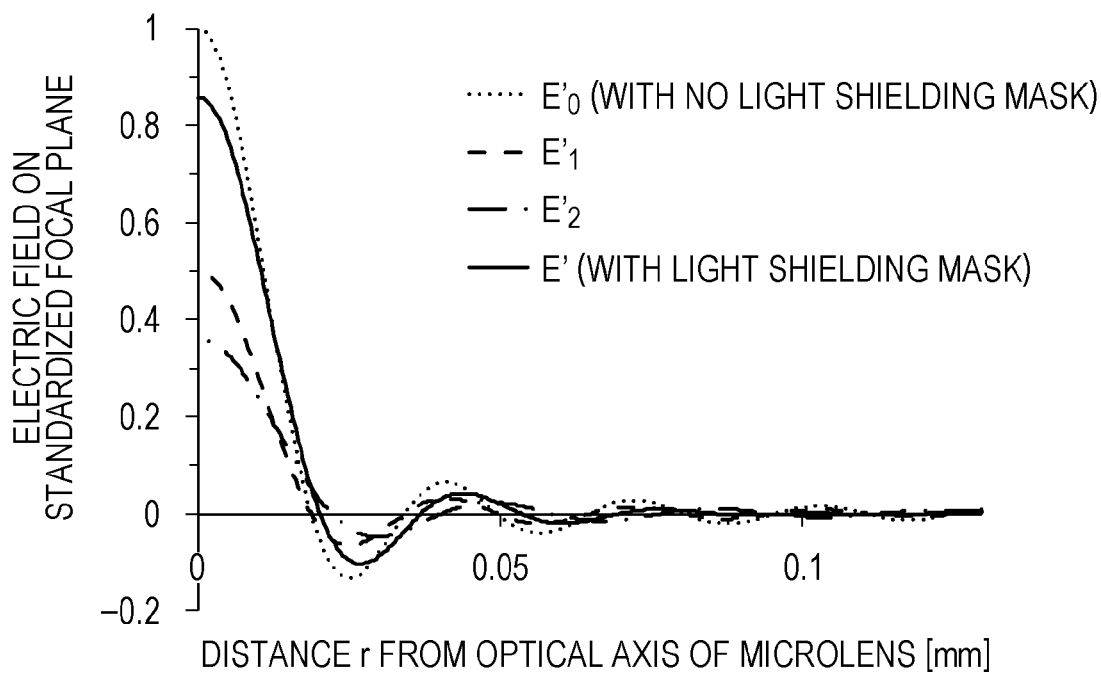
FIGS. 3A and 3B are graphs illustrating electric field distribution on a focal plane in a case where planar wave light vertically enters a lens according to the first embodiment, where
Figure 3B:
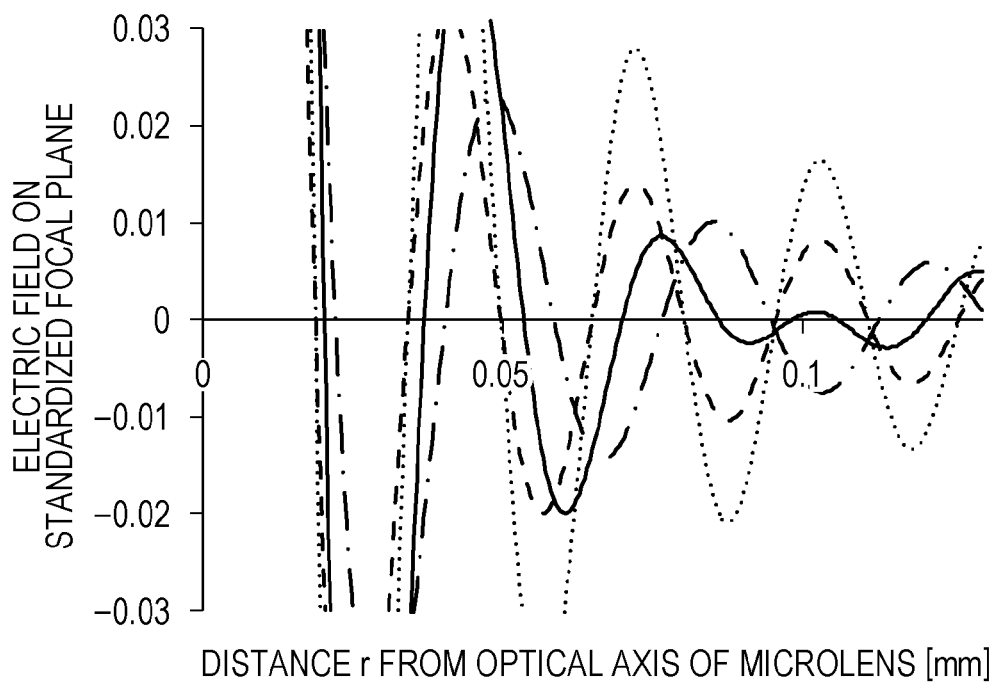

FIGS. 3A and 3B are graphs illustrating electric field distribution on a focal plane in a case where planar wave light vertically enters a lens 109, where FIG. 3B is an enlargement of the vertical axis in FIG. 3A. The dotted lines in FIGS. 3A and 3B illustrate the results of calculating electric filed distribution at the focal plane, with f=2.4 mm, $\lambda$=638 nm, p=0.1 mm, and R=0.05 mm being substituted into Expression (1) as an example. The value of the vertical axis has been normalized to be 1 where r=0.

A light spot formed by a lens 109 adjacent to another lens 109 is called an "adjacent spot". Although the position of an adjacent spot will differ somewhat according to the inclination of the wavefront of the test light and the curvature of the lens, the position will be around a position that is a distance p away from the intersection between the optical axis 109C of the other lens 109 and the light-receiving surface 107A of the imaging device 107, where r=p. An intense electric field of the diffracted light is generated at this region (r=0.1 mm), as indicated by the dotted line in FIGS. 3A and 3B.

In order to suppress the diffracted light of nearby adjacent spots in the first embodiment, the light shielding mask 121 of each lens 109 is provided corresponding to an inner side region including a perimeter edge portion 111A of the lens member 111. The light shielding mask 121 of each lens 109 is configured so that part of the light passes through. Specifically, the light shielding mask 121 has a ring-shaped region having a width $\lambda f/2p$ on the inner side of the perimeter edge portion 111A of the lens member 111. The light transmittance of the light shielding mask 121 is 0.25.

The light shielding mask 121 in the first embodiment is configured using a Cr metal film, but the light shielding mask 121 may be formed using other metal films, or materials other than metal film, as long as the above condition is met. The light shielding mask 121 does not have to be in contact with the lens member 111, i.e., the light shielding mask 121 may be separated from the lens member 111.

The light transmittance of the light shielding mask 121 can be controlled by the thickness of the Cr film (metal film). The relationship between film thickness and light transmittance can be simulated based on a mode described in H. A. Macleod, "Thin Film Optical Filters fourth edition", p. 52-61, CRC Press, 2010).

Figure 4:
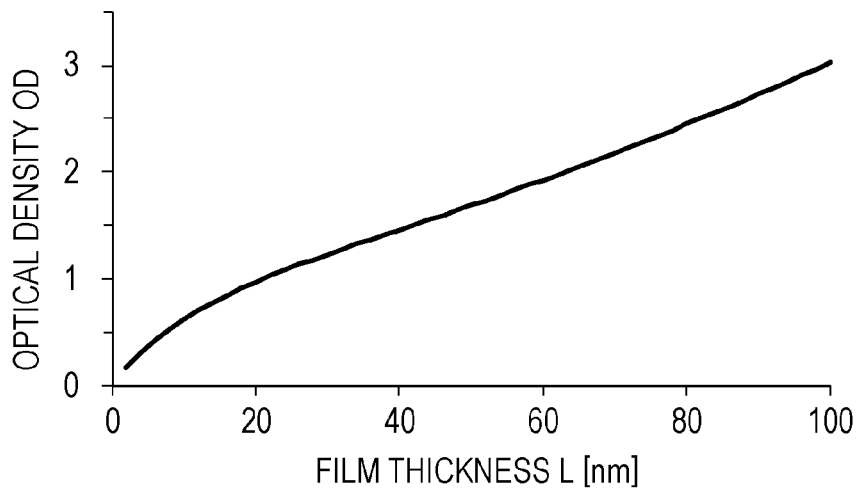
FIG. 4 is a graph illustrating the results of simulating the relationship between optical density (OD) and film thickness L of a chromium film.

FIG. 4 is a graph illustrating the results of simulating the relationship between the optical density OD of the Cr film at wavelength 638 nm and the film thickness L, using the simulation model described above. The optical density OD and light transmittance T are in a relationship of OD=−$\log_{10}$T. For example, light transmittance 0.25 is equivalent to optical density 0.60, and the film thickness of the Cr film to satisfy this is found to be 9.7 nm, as can be seen from FIG. 4. The relationship between the film thickness L and light transmittance T is approximated as generally T=exp(−4$\pi\kappa$L/$\lambda$) using the imaginary part $\kappa$ of the refractive index of the film in a simpler form, so the film thickness for realizing the desired light transmittance can be obtained using this relationship. Moreover, the relationship between film thickness L and light transmittance T may be found by experimentation beforehand.

An antireflection film, omitted from illustration, may be formed on the face of the MLA 105 on which the light shielding masks 121 and 122 are not formed. Although FIG. 2B illustrates an example where the lens face and light shielding masks are formed on the emitting side of the MLA 105, these may be formed on the incident side.

Wavefront Measurement Procedures

Figure 5:
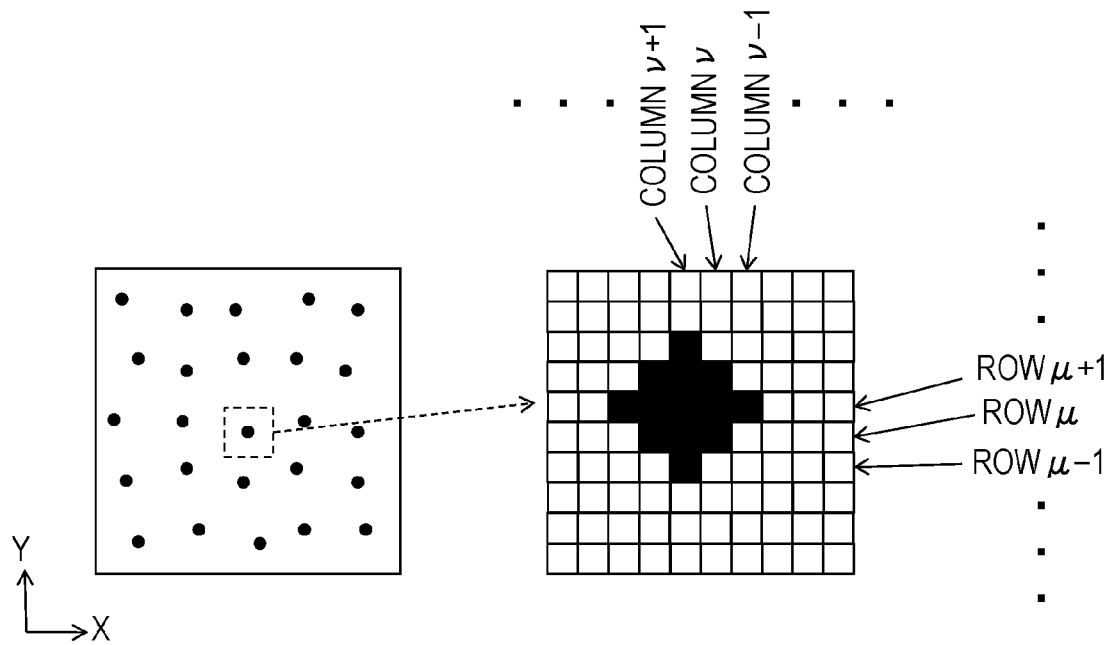
FIG. 5 is a schematic diagram of spot images imaged by an imaging device.

Procedures for wavefront measurement using the SHWS 101 will be described. First, test light is input to the MLA 105, and the multiple spot images formed on the light-receiving surface 107A of the imaging device 107 are imaged. FIG. 5 is a schematic diagram of spot images imaged by the imaging device 107. The spot images are made up of signals $I_{\mu,\nu}$ (where $\mu$=1, 2, . . . , and $\nu$=1, 2, . . . ), from $\mu$ rows by $\nu$ columns of pixels, output by the imaging device 107.

Next, the computing device 103 calculates the positions $(X_{g,h}, Y_{g,h})$ of spots formed by lenses 109 situated at g rows by h columns (where g=1, 2, . . . , and h=1, 2, . . . ), from the output signals $I_{\mu,\nu}$ of the imaging device 107. An example of a method of detecting the spot positions is to extract an image near a point where a spot image forms a peak, and to obtain the center of gravity thereof using Expression (2).

$$X_{g,h} = \frac{\sum_\mu \sum_\nu I^s_{\mu,\nu} \nu p_{ccd}}{\sum_\mu \sum_\nu I^s_{\mu,\nu}},$$

$$Y_{g,h} = \frac{\sum_\mu \sum_\nu I^s_{\mu,\nu} \mu p_{ccd}}{\sum_\mu \sum_\nu I^s_{\mu,\nu}}$$

Expression (2)

where $p_{ccd}$ represents the pitch of the pixels of the imaging device 107. Although the value of s is set to a value around 1 to 3, this preferably is adjusted as appropriate in accordance with the relationship between the spot size and the pitch $p_{ccd}$ of the pixels of the imaging device 107. While the first embodiment uses Expression (2), there are other methods, an example of a method that may be used being fitting each spot image with an expression, such as a Gaussian function or the like, and finding the center thereof as the position of the spot.

Further, the computing device 103 calculates the inclination ($\partial w/\partial X$, $\partial w/\partial Y$) of light rays entering the MLA 105 following Expression (3)

$$\left.\frac{\partial w(X,Y)}{\partial X}\right|_{X=X_{g,h},Y=Y_{g,h}} = \frac{X_{g,h}-X_{0,g,h}}{l_{g,h}}, \quad \text{Expression (3)}$$

$$\left.\frac{\partial w(X,Y)}{\partial Y}\right|_{X=X_{g,h},Y=Y_{g,h}} = \frac{Y_{g,h}-Y_{0,g,h}}{l_{g,h}}$$

where ($X_{0,g,h}$, $Y_{0,g,h}$) represents the position of the optical axis 109C of a lens 109 at the g'th row and h'th column, and $l_{g,h}$ represents the distance between the lens 109 at the g'th row and h'th column and the light-receiving surface 107A of the imaging device 107.

The position ($X_{0,g,h}$, $Y_{0,g,h}$) of the optical axis 109C of the lens 109 is acquired beforehand, using a method such as described in "Applied Optics" Vol. 44, No. 30, p 6419, for example. The SHWS 101 is assembled so that the distance $l_{g,h}$ is as close to being equal to f as possible, but there does exist finite error in the assembly thereof. Accordingly, the distance $l_{g,h}$ is calibrated by a known method, and precise values are acquired beforehand. Thereafter, the computing device 103 integrates ($\partial w/\partial X$, $\partial w/\partial Y$) two dimensionally, and obtains the wavefront 104 of the test light as w(X, Y).

Figure 6A:
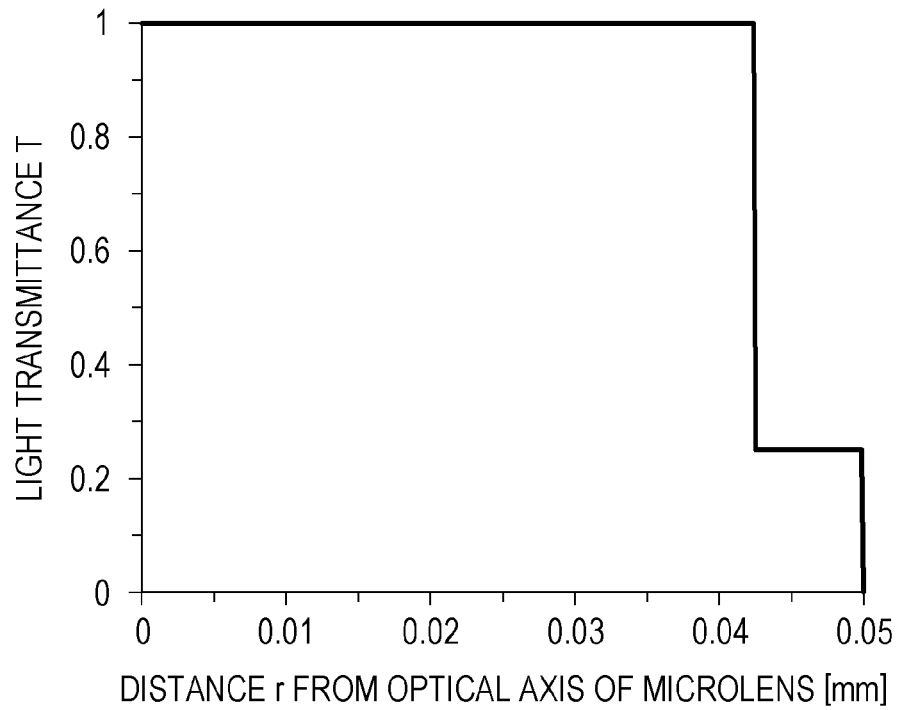
FIGS. 6A and 6B are graphs showing light transmittance T and an absolute value t of electric field transmission coefficient, as a function of a distance r in a direction orthogonal to the optical axis of a lens having a light shielding mask according to the first embodiment, where

FIG. 6A is a graph illustrating the light transmittance T of the lens 109 having the light shielding mask 121 according to the first embodiment, in relation to the distance r from the optical axis 109C in an orthogonal direction to the optical axis 109C. The light transmittance distribution of the lens 109 follows a stepped decrease in intensity, as illustrated in FIG. 6A. As a result, the electric field intensity of diffracted light near an adjacent spot on the focal plane is reduced by 73% in comparison with a case where no light shielding mask 121 is provided, due to a later-described reason.

The electric field intensity is proportionate to the ½th power of the intensity of light, so the absolute value t of an electric field transmission coefficient of the light shielding mask 121 is ½th power of the light transmittance T. Accordingly, the absolute value of the electric field transmission coefficient of the light shielding mask 121 is $\sqrt{0.25}=0.5$.

Note that t is an absolute value, which means that it is a positive real number and not a complex number. This parameter is only a parameter that represents the ratio between the electric field intensity of the incident light to the lens 109 and the electric field intensity of the emitted light, and does not express the lens operations of converting planar wave light into sphere wave light.

The light shielding mask 121 is formed only in a region expressed by r≥(R−λf/2p). Accordingly, the light shielding mask 121 can be deemed to be a circular aperture having a radius of (R−λf/2p) that only acts upon half of the electric field $E_0$ of the incident light. Further, the perimeter edge portion 109A of the lens 109 acts as a circular aperture having a radius R, with regard to light passing through the light shielding mask 121.

Figure 6B:
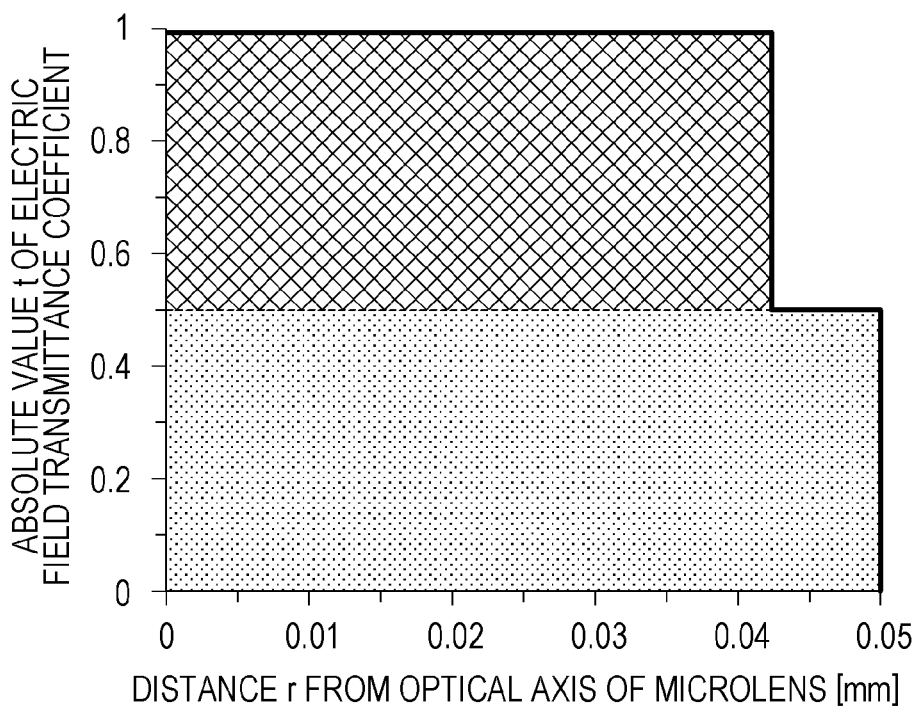

FIG. 6B is a graph illustrating the absolute value t of the electric field transmission coefficient as to the distance r from the optical axis 109C of the lens 109 having the light shielding mask 121 according to the first embodiment, in a direction orthogonal to the optical axis 109C. The lens 109 has the light shielding mask 121 and is sectioned by the perimeter edge portions 109A, so the absolute value of the electric field transmission coefficient is as illustrated in FIG. 6B. That is, the electric field immediately after having passed through the lens 109 is a combination of the electric field that has passed through the circular aperture with the radius R and has intensity $E_0/2$ (the dotted portion in FIG. 6B) and the electric field that has passed through the circular aperture with the radius (R−λf/2p) and has intensity $E_0/2$ (the hatched portion in FIG. 6B). As a result, the electric field on the focal plane of the lens 109 is a combination of electric field $E'_1$ when light of the electric field $E_0/2$ enters the transparent lens with the radius R, and electric field $E'_2$ when light of the electric field $E_0/2$ enters the transparent lens with the radius (R−λf/2p). The electric fields $E'_1$ and $E'_2$ at the focal plane of the lens 109, i.e., on the light-receiving surface 107A of the imaging device 107, are approximated as shown in Expression (4), with reference to Expression (1).

$$E'_1(r) \approx \frac{E_0 R}{r} J_1\left(2\pi \frac{R}{\lambda f}r\right), \quad \text{Expression (4)}$$

$$E'_2(r) \approx \frac{E_0 R}{r} J_1\left(2\pi\left(\frac{R}{\lambda f}-\frac{1}{2p}\right)r\right)$$

$E'_1$ and $E'_2$ are approximated by Expression (5) at the region satisfying r>>λf/R (see Moriguchi et al, "Iwanami Mathematical Formulas III, Special Functions" Iwanami Shoten, 1960).

$$E'_1(r) \approx E_0\sqrt{\frac{R\lambda f}{r^3}}\cos\left(2\pi\frac{R}{\lambda f}r-\frac{3}{4}\pi\right), \quad \text{Expression (5)}$$

$$E'_2(r) \approx E_0\sqrt{\frac{R\lambda f}{r^3}}\cos\left[2\pi\left(\frac{R}{\lambda f}-\frac{1}{2p}\right)r-\frac{3}{4}\pi\right]$$

That is to say, the spatial distribution of the electric fields $E'_1$ and $E'_2$ that are in regions away from the optical axis 109C on the focal plane have approximately equal amplitude, and exhibit simple harmonic motion where the spatial frequencies differ from each other by 1/(2p). The phases of the simple harmonic motion is shifted by π between the electric field $E'_1$ and electric field $E'_2$ at r=p where the adjacent spot appears, so combining these two cancels out the electric field of each. This interference effect of electric fields suppresses diffracted light near the adjacent spot.

The dashed line and single-dot dashed line in FIGS. 3A and 3B are the results of having calculated the electric fields $E'_1$ and $E'_2$ by Expression (4). The values on the vertical axis have been normalized so as to allow comparison with the dotted line. The same values as used for f, λ, p, and R, as when obtaining the dotted line. The mechanism of suppressing diffracted light described above will be briefly described using these calculation results. That is to say, the lens 109 having the light shielding mask 121 is equivalent to the radius of the region acting as the lens having shrunk by λf/2p as to half of the incident optical electric field. Accordingly, just half of the electric field $E'_0$ of diffracted light near the adjacent spot indicated by the dotted lines in FIGS. 3A and 3B, the phase of which is inverted, becomes $E'_2$ (the single-dot dashed line), thereby canceling out the remaining half electric field $E'_1$ of diffracted light (dashed line) the phase of which is not inverted, and thus the electric field of diffracted light is suppressed.

The solid line in FIGS. 3A and 3B is the result of summing the $E'_1$ and $E'_2$ calculated in Expression (4), and calculating the electric field distribution on the focal plane of the lens 109 having the light shielding mask 121. The electric field of diffracted light is suppressed nearby r=p, as compared to a case where no light shielding mask 121 is provided (dotted line). Further, a percentage of inhibition β of the electric field of diffracted light can be quantitatively obtained by Expression (6)

$$\beta = 1 - \frac{\int_{p(1-\alpha)}^{p(1+\alpha)}(E'_1(r) + E'_2(r))dr/(E'_1(0) + E'_2(0))}{\int_{p(1-\alpha)}^{p(1+\alpha)}E'_0(r)dr/E'_0(0)}$$

Expression (6)

where α is a dimensionless quantity where the width of a region where diffracted light should be suppressed has been normalized by p. This α preferably is decided in accordance with spot size and dynamic range required by the SHWS 101. For example, substituting Expressions (1) and (4) into Expression (6) with α=0.3 yields a calculated β of 0.73. That is to say, the percentage of inhibition of the electric field of diffracted light nearby the adjacent spot due to the light shielding mask 121 is 73%, which is a large value.

Case where Lens 109 Exhibits Light Transmittance Distribution of N Steps

The first embodiment introduces the light shielding mask 121, thereby imparting a two-step light transmittance distribution to the lens 109, and suppressing diffracted light nearby the adjacent spot. The following is a description of expanding this to a case where the lens 109 has N steps (where N is an integer of 2 or larger) in light transmittance distribution. Conditions for suppressing electric field of diffracted light nearby the adjacent spot will be found here again.

The distribution t(r) of absolute values of electric field transmission coefficients for the lens 109 exhibiting N-stepped light transmittance distribution is as shown in Expression (7)

$$t(r) = \begin{cases} \Delta_1 & (R - \delta_2 < r \le R) \\ \Delta_1 + \Delta_2 & (R - \delta_3 < r \le R - \delta_2) \\ \vdots \\ \sum_{k=1}^{j} \Delta_k & (R - \delta_{j+1} < r \le R - \delta_j) \\ \vdots \\ \sum_{k=1}^{N} \Delta_k = t_0 & (r \le R - \delta_N) \end{cases}$$

Expression (7)

where $t_0$ represents the absolute value of the electric field transmission coefficient of the lens 109 where r=0. $\delta_j$ is the distance from the perimeter edge portions 109A at each lens 109 to the inner side thereof. $\Delta_j$ is the amount of change in the absolute value of the electric field transmission coefficient, at a position removed from the perimeter edge portions 109A of the lens 109 toward the inner side by the distance $\delta_j$. Note that $\delta_1$=0 here. $\Delta_1$ is the absolute value of the electric field transmission coefficient at the perimeter edge portions 109A of the lens 109.

The electric field E' at the focal plane of the lens 109 can be deemed to be a combination of electric field $E'_j$ at the focal plane when light of electric field intensity $\Delta_j E_0$ is collected by a transparent lens having a radius of $(R-\delta_j)$, with regard to j=1, 2, and so on through N. $E'_j$ is expressed as in Expression (8) referencing Expression (5) in the region where r>>λf/R, and E' is expressed using $E_j$ as in Expression (9).

$$E'_j(r) \approx 2E_0\Delta_j\sqrt{\frac{R\lambda f}{r^3}}\cos\left[\frac{2\pi(R-\delta_j)}{\lambda f}r - \frac{3}{4}\pi\right]$$

Expression (8)

$$E'(r) = \sum_{j=1}^{N} E'_j(r)$$

Expression (9)

On the other hand, in a lens 109 having an absolute value for the electric field transmission coefficient that is uniform at $t_0$, the spatial distribution of electric field $E_0'$ nearby an adjacent spot on the focal plane exhibits simple harmonic motion of amplitude $E'_a$ in the radial direction as indicated by Expression (10), and the amplitude $s'_a$ of a differential value thereof is the value indicated by Expression (11).

$$E'_a \approx 2E_0 t_0 \sqrt{\frac{R\lambda f}{p^3}}$$

Expression (10)

$$s'_a \approx 4\pi E_0 t_0 \sqrt{\frac{R^3}{p^3 \lambda f}}$$

Expression (11)

In order for the electric field of diffracted light nearby r=p on the focal plane to be sufficiently suppressed by the absolute value of the electric field transmission coefficient of the lens 109 indicating the distribution in Expression (7), Expressions (12) and (13) must be satisfied.

$$|E'(p)| \ll E'_a$$

Expression (12)

$$\left|\frac{dE'(r)}{dr}\right|_{r=p} \ll s_a$$

Expression (13)

Substituting Expressions (8) and (9) into Expressions (12) and (13) yields Expression (14)

$$\frac{1}{t_0}\left|\sum_{j=1}^{N} u_j\right| \ll 1$$

Expression (14)

where $\phi_j = 2\pi p\delta_j/\lambda f$, $u_j = \Delta_j\exp(i\phi_j)$ holds. The i is an imaginary unit. $\phi_j$ represents the phase of vibration regarding $E'_j(r)$ vibrating in the space where r=p, $\Delta_j$ represents the magnitude of the amplitude, and $u_j$ is a complex number containing both. This Expression (14) is equivalent to a generalized conditional expression for suppressing the electric field of diffracted light nearby adjacent spots, in a case where the lens 109 has an N-stepped light transmittance distribution.

Figure 7:
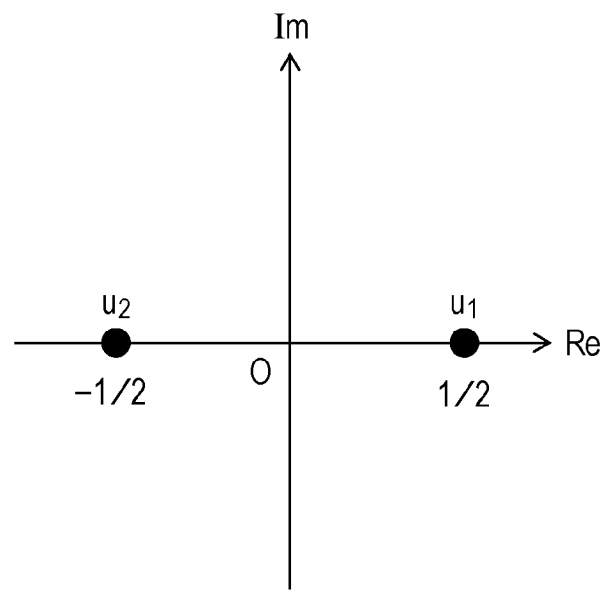
FIG. 7 is a graph showing values of $u_1$ and $u_2$ on a complex plane according to the first embodiment.

The electric field transmission coefficient distribution in FIG. 6B is obtained by substituting N=2, $\delta_2=\lambda f/2p$, $\Delta_1=\Delta_2=0.5$ into Expression (7). The $u_1$ and $u_2$ obtained from these values are 0.5 and −0.5, respectively. FIG. 7 is a graph expressing the values of $u_1$ and $u_2$ on a complex plane. The total of $u_1$ and $u_2$ is 0, satisfying Expression (14). That is to say, Expression (14) is a conditional expression encompassing the electric field transmission coefficient distribution in FIG. 6B.

Now, according to Expressions (1) and (10), the ratio between intensity $E'_a$ of electric field of diffracted light that a lens 109 with uniform light transmittance forms nearby an adjacent spot, and spot peak electric field intensity $E'(r=0)$, i.e., the ratio $(E'_a/E'(r=0))$, is in inverse proportion to p cubed, where R≈p. If the pitch p of the optical axes 109C of the lenses 109 is reduced by 20% to improve the resolution of the SHWS, the electric field of diffracted light is approximately double nearby the adjacent spots, and the spot detection error and wavefront measurement error is also approximately doubled. For example, in a case where the pitch p of the lenses is 150 µm in a state where there is no light shielding mask 121, and this is reduced 20% to 120 µm, the electric field of diffracted light is approximately double nearby the adjacent spots. Accordingly, the electric field of diffracted light needs to be at least halved nearby the adjacent spots to compensate for the increase of error in the SHWS due to having reduced the pitch p by 20%. The left side of Expression (14) generally is the same as the ratio of electric field intensities of diffracted light near r=p between when the electric field transmission coefficient of the lens 109 exhibits the distribution in Expression (7) and when the distribution is uniform at $t_0$. Accordingly, a conditional expression to compensate for the increase of error in the SHWS due to having reduced the pitch p by 20% is as shown in Expression (15).

$$\frac{1}{t_0}\left|\sum_{j=1}^{N} u_j\right| \leq 0.5 \qquad \text{Expression (15)}$$

That is to say, the absolute value of the total of $u_j$ defined by $u_j=\Delta_j\exp(2\pi ip\delta_j/\lambda f)$ is made to be half or less the total of $\Delta_j$.

Further, in order to compensate for the increase in SHWS error by changing the pitch p to ⅔ times, the electric field of diffracted light nearby adjacent spots needs to be 0.3 times. Expression (16) is a conditional expression for this compensation.

$$\frac{1}{t_0}\left|\sum_{j=1}^{N} u_j\right| \leq 0.3 \qquad \text{Expression (16)}$$

As described above, in the first embodiment, each light shielding mask 121 is formed such that the absolute value of the electric field transmission coefficient increases in steps by a change amount $\Delta_j$ from the perimeter edge portion 109A of the lens 109 inwards, at a position inward from the perimeter edge portion of the lens 109 by a distance $\delta_j$. The light shielding masks 121 are formed in the first embodiment to satisfy Expression (15), and more preferably Expression (16). Accordingly, diffraction light formed by one lens 109 at the position of a spot formed by another adjacent lens 109 can be sufficiently suppressed. As a result, light spot distortion due to diffracted light at each of the lenses 109 can be effectively suppressed. Thus, spot position detection error can be reduced, and high-precision wavefront measurement can be realized.

The light shielding masks 121 are metal film formed on the surface of each lens member 111 in the first embodiment, and the absolute value of the electric field transmission coefficient is set (controlled) in a stepped manner by the thickness of the light shielding masks 121. Accordingly, the number of times of repeating the film forming step of the metal film can be reduced as compared to a case of forming a light shielding mask exhibiting a smooth distribution (e.g., Gaussian distribution) for the light transmittance with a metal film exhibiting thickness distribution, thereby lowering costs.

Particularly, the light transmittance of the light shielding mask 121 according to the first embodiment is uniform, so there is no need to repeat the film forming step when forming the light shielding mask 121. Thus, the MLA 105 can be manufactured more inexpensively, and accordingly the SHWS 101 can be manufactured more inexpensively.

Note that the light shielding mask may be formed as a density filter of which the light transmittance distribution is controlled by number density of minute openings. However, forming a light shielding mask using a density filter generates scattered light, so the spot detection precision of the SHWS configured using a MLA including this arrangement may suffer. Accordingly, the film thickness of the light shielding mask 121 is preferably used to control (set) the electric field transmission coefficient, as described in the first embodiment.

Method of Manufacturing Optical Device

The SHWS 101 according to the first embodiment can be used to manufacture the optical device 200 having a light source and optical element. Specifically, the optical device 200 is first manufactured (manufacturing step). Next, the wavefront of emitted light from the optical device 200 is measured using the wavefront measurement apparatus 100 (measuring step). The position of the optical element inside the optical device 200 is then adjusted or the optical element is processed, to suppress aberration of the measured wavefront.

Second Embodiment

A second embodiment is the same as the first embodiment with regard to the points that the SHWS 101 is configured using the MLA 105, and that the MLA 105 has multiple lenses 109 arrayed at a pitch p. The second embodiment differs from the first embodiment with regard to the light shielding mask 121 of the lenses 109.

$\delta_j$ Design Guide

The electric field of diffracted light nearby adjacent spots can be reduced even more that the SHWS 101 according to the first embodiment by further combining electric fields $E'_j$ having different spatial frequencies as to the electric fields $E'_1$ and $E'_2$ to cancel out (where j=3, 4, and so on through N). At this time, the phase of $E'_j$ at r=p is preferably shifted as to $E'_1$ and $E'_2$ by 0° or 180°. Accordingly, the light shielding masks 121 of the lenses 109 in the second embodiment are formed so that the absolute value of the electric field transmission coefficient of the lenses 109 exhibits a distribution obtained by substituting $t_0=1$, N≥3, and $$\delta_j = \frac{(j-1)\lambda f}{2p} \qquad \text{Expression (17)}$$

into Expression (7). More specifically, the light shielding masks 121 are formed so that the absolute value t'(r) of the electric field transmission coefficient exhibits a stepped distribution shown in Expression (18) at a region R−(N−1)λf/2p≤r≤R.

$$t'(r) = \qquad \text{Expression (18)}$$

$$\begin{cases} \Delta_1 & \left(R - \frac{\lambda f}{2p} \times 1 < r \le R\right) \\ \Delta_1 + \Delta_2 & \left(R - \frac{\lambda f}{2p} \times 2 < r \le R - \frac{\lambda f}{2p} \times 1\right) \\ \vdots \\ \sum_{k=1}^{N-1} \Delta_k & \left(R - \frac{\lambda f}{2p} \times (N-1) < r \le R - \frac{\lambda f}{2p} \times (N-2)\right) \end{cases}$$

The light shielding masks 121 are configured using a Cr film (metal film), the same as in the first embodiment. The electric field transmission coefficient at each region in the light shielding masks 121 is controlled by the thickness of the Cr film, referencing FIG. 4, for example.

Note that $t_0=1$, in which case the absolute value t of the electric field transmission coefficient of the lens 109 in the region r≤R−(N−1)λf/2p according to Expressions (7) and (17) is 1, so no light shielding mask 121 is formed in this region. Thus, by designing where $t_0=1$, the formation region of the light shielding mask 121 can be reduced, and the amount of light passing through the lens 109 can be secured. $\Delta_N = 1 - \Sigma_{k=1}^{N-1}\Delta_k$ at this time.

The light shielding mask 121 can be conceived as being a combination of circular apertures having a radius R−(j−1)λf/2p with regard to j=2, . . . , N. When light having electric field intensity $E_0$ enters the light shielding mask 121, the light shielding mask 121 acts as a circular aperture of radius R−(j−1)λf/2p as to electric field having intensity $E_0\Delta_j$. Further, the perimeter edge portion 109A of the lens 109 acts as a circular apertures of radius R as to electric field having intensity $E_0\Delta_1$. As a result, the electric field E' at the focal plane can be expressed as a combination of electric fields of diffracted light generated from multiple transparent lenses having different diameters, which in the region of r>>λf/R, can be expressed as in Expression (19), obtained by substituting Expression (17) into Expressions (8) and (9).

$$E'(r) \approx \sum_{j=1}^{N} 2E_0\Delta_j \sqrt{\frac{[R-(j-1)\lambda f/2p]\lambda f}{r^3}} \qquad \text{Expression (19)}$$

$$\cos\left[2\pi\left(\frac{R}{\lambda f} - \frac{j-1}{2p}\right)r - \frac{3}{4}\pi\right]$$

$\Delta_j$ Design Guide

A value of $\Delta_1$ through $\Delta_N$ such that $E'_1$ through $E'_N$ cancel each other out nearby r=p can be obtained as follows. That is to say, a Taylor expansion of E'(r) around r=p yields Expression (20).

$$E'(r) = \sum_{q=0}^{\infty} \left.\frac{d^q E'(r)}{dr^q}\right|_{r=p} (r-p)^q \qquad \text{Expression (20)}$$

The electric field of diffracted light can be suppressed nearby r=p by the following Expression (21) regarding q=0, 1, and so on through N−2.

$$\left.\frac{d^q E'(r)}{dr^q}\right|_{r=p} = 0 \qquad \text{Expression (21)}$$

This expression (21) corresponds to Expression (12) when q=0, and corresponds to Expression (13) when q=1. Satisfying these two expressions controls the electric field of diffracted light nearby adjacent spots to a certain degree, but the second embodiment suppresses the electric field of diffracted light more precisely by satisfying these expressions even when q≥2.

Substituting Expression (19) into Expression (21) with r=p>>λf/R yields Expression (22).

$$\sum_{j=1}^{N} \Delta_j (j-1)^q (-1)^j = 0 \qquad \text{Expression (22)}$$

Further, $t_0=1$ holds, so Expression (23) holds.

$$\sum_{j=1}^{N} \Delta_j = 1 \qquad \text{Expression (23)}$$

Solving Expressions (22) and (23) as simultaneous equations with q=0 through (N−2) yields the solution to Expression (24).

$$\Delta_j = \frac{{}_{N-1}C_{j-1}}{\sum_{j=1}^{N} {}_{N-1}C_{j-1}} \qquad \text{Expression (24)}$$

The values of $\Delta_j$ calculated by Expression (24) with N=3 through 7 are shown in Table 1.

TABLE 1

| | N = 3 | N = 4 | N = 5 | N = 6 | N = 7 |
|---|---|---|---|---|---|
| $\Delta_1$ | 1/4 | 1/8 | 1/16 | 1/32 | 1/64 |
| $\Delta_2$ | 1/2 | 3/8 | 1/4 | 5/32 | 3/32 |
| $\Delta_3$ | 1/4 | 3/8 | 3/8 | 5/16 | 15/64 |
| $\Delta_4$ | | 1/8 | 1/4 | 5/16 | 5/16 |
| $\Delta_5$ | | | 1/16 | 5/32 | 15/64 |
| $\Delta_6$ | | | | 1/32 | 3/32 |
| $\Delta_7$ | | | | | 1/64 |

Figure 8:
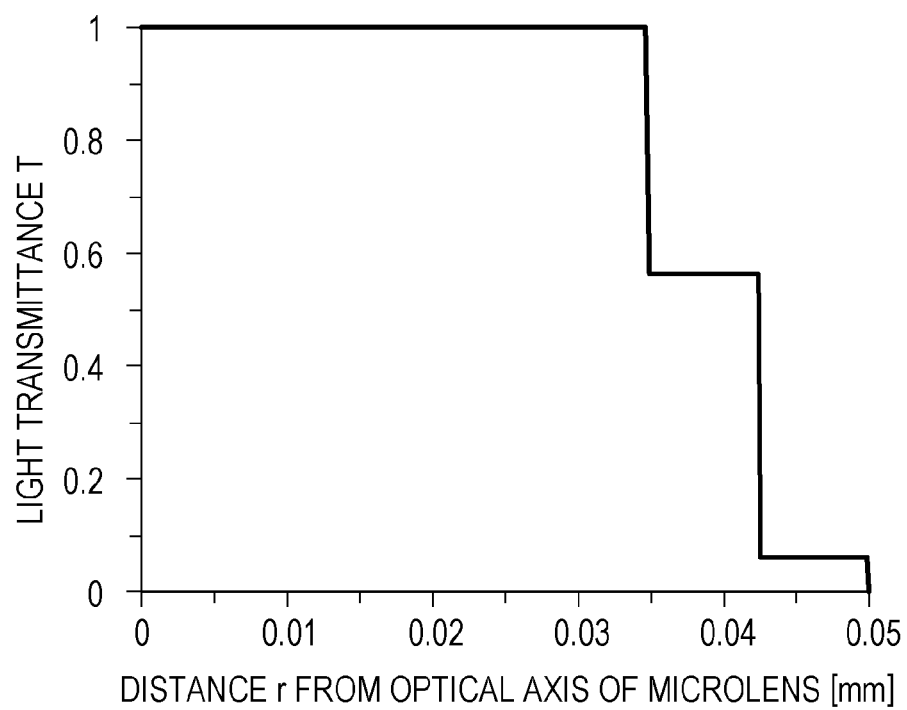
FIG. 8 is a graph showing results of calculating light transmittance distribution of a lens where N=3 according to a second embodiment.

FIG. 8 is a graph illustrating the results of calculating the light transmittance distribution of a lens 109 in the second embodiment with N=3.

Relationship to First Embodiment

Substituting N=2 into Expression (24) yields $\Delta_1=\Delta_2=0.5$, and according to Expression (17), $\delta_2=\lambda f/2p$. Substituting these values into Expression (7) matches the electric field transmission coefficient distribution of the lenses 109 according to the first embodiment (FIG. 6B). That is to say, N≥2 in Expression (24) gives a conditional expression encompassing the lenses 109 of the first embodiment as well.

Further, according to Expression (17), in the light shielding mask 121 according to the second embodiment, $\phi_j = \phi_{2j'-1} = 2\pi p \delta_{2j'-1}/\lambda f = 2\pi(j'-1)$ holds and $u_j = u_{2j'-1} = \Delta_{2j'-1} \exp(i\phi_{2j'-1}) = \Delta_{2j'-1}$ holds when j is an odd number. Here, j' is a natural number. According to an expression where q=0 in Expression (22), and Expression (23), the total of $\Delta_{2j'-1}$ is 0.5, so the total of $u_{2j'-1}$ also is 0.5. On the other hand, $\phi_j = \phi_{2j'} = 2\pi p \delta_{2j'}/\lambda f = 2\pi(j'-\frac{1}{2})$ holds and $u_j = u_{2j'} = \Delta_{2j'} \exp(i\phi_{2j'}) = -\Delta_{2j'}$ holds when j is an even number. $\Delta_{2j'}$ is 0.5, so the total of $u_{2j'}$ is −0.5. As a result the total of all $u_j$ is 0, so the generalized conditional Expression (14) shown in the first embodiment, and Expressions (15) and (16) derived therefrom are satisfied. That is to say, Expressions (14) through (16) are conditional expresses encompassing the design of the light shielding mask 121 according to the second embodiment.

Effects of Suppressing Electric Field of Diffracted Light by Light Shielding Mask 121

Figure 9A:
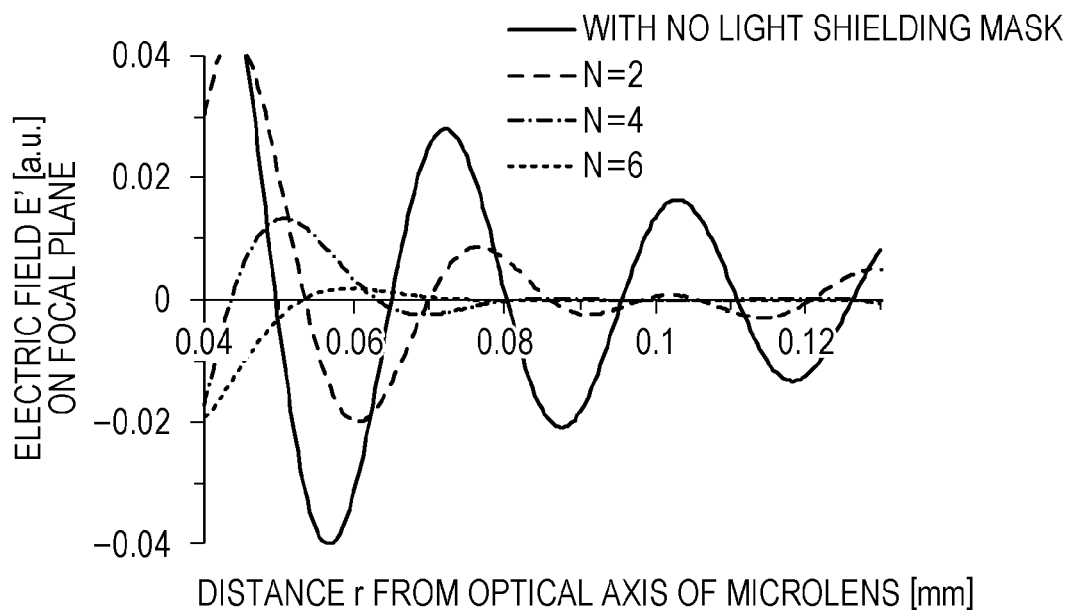
FIGS. 9A and 9B are graphs related to an operation of the shielding mask, FIG. 9A showing the results of calculating the relationship between electric field distribution on a focal plane and N, and FIG. 9B showing the results of calculating the relationship between percentage of inhibition β at a diffracted light electric field and N according to the second embodiment.
Figure 9B:
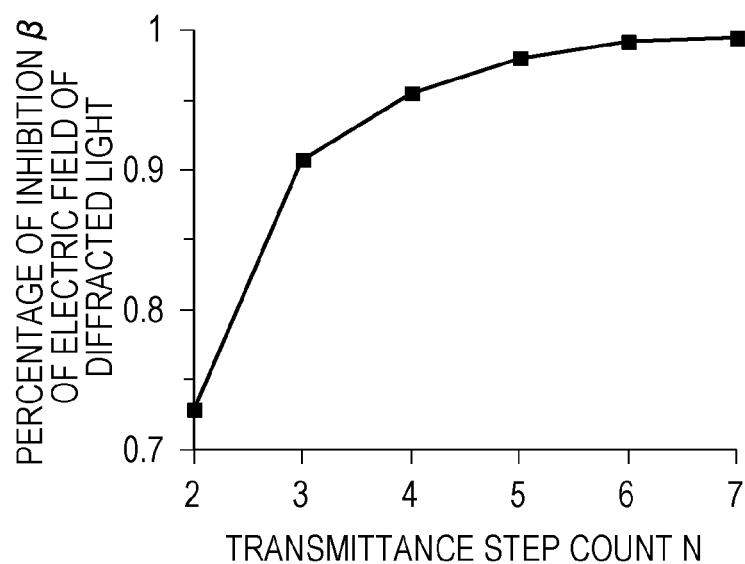

FIG. 9A is a graph illustrating the result of calculating the relationship between electric field distribution at the focal plane, and N, in a case where Expression (24) is substituted into Expression (19), and planar wave light perpendicularly enters the lens 109 having the light shielding mask 121. The following values are set for calculation; p=0.1 mm, λ=638 nm, f=2.4 mm, and R=0.05 mm. FIG. 9B a graph illustrating the result of calculating the relationship between percentage of inhibition β of electric field of diffracted light, and N, in a case where the results of FIG. 9A are substituted into Expression (6), and α=0.3. Both FIGS. 9A and 9B show that a high percentage of inhibition of electric field of diffracted light can be obtained by the light shielding mask 121, and further that the value thereof improves as N increases. The light shielding mask 121 is formed so that the electric field transmission coefficients have three steps or more (N≥3) in the second embodiment, so the electric field of diffracted light at adjacent spots can be further reduced as compared to the first embodiment where N=2.

Relationship Between N and Cost

R>λf(N−1)/2p in Expression (18), so the upper limit of N, which is $N_{max}$, is the largest integer that does not exceed 1+(2pR/λf). Further, the upper limit of R is p/2, so the upper limit of N, which is $N_{max}$, is the largest integer that does not exceed 1+(p²/λf). For example, if p=0.1 mm, λ=638 nm, f=2.4 mm, and R=0.05 mm, $N_{max}$=7 will hold. The number of steps of light transmittance of the light shielding mask 121 is six when N=7, which is not a great many. Accordingly, even in a case where N assumes the largest value, there is no need to repeat the film forming step to form the light shielding mask 121 a great many times, and accordingly the wavefront measurement apparatus according to the second embodiment can be manufactured within realistic costs.

Having stated the above, it still is true that the larger the value of N is, there will be an increase somewhat in the cost of manufacturing. Accordingly, the value of N is preferably decided taking into mind both the desired capabilities and permitted cost. In a case where improvement in the percentage of inhibition of the electric field of diffracted light is desired even if a certain level of cost increase has to be accepted, N can be set to a large value within a range where 1+(p²/λf) is not exceeded. Conversely, if a high percentage of inhibition is not that important but cost conditions are strict, FIG. 9B can be referenced for example, and N set to a value as small as possible within a range where the necessary percentage of inhibition can be ensured.

Permissible Amount of Deviation of δ from Design Value

Although a space δ (i.e., $\delta_j - \delta_{j-1}$) between boundary lines of regions having different light transmittances is set to λf/2p for the light shielding mask 121 based on Expression (18), the electric field of diffracted light can be sufficiently suppressed even if δ departs from this value somewhat. A permissible range of δ will be studied here. The values for the light shielding mask 121 in a case where N=3 are $\delta_2 = \lambda f/2p$, $\delta_3 = \lambda f/p$, $\Delta_1 = \Delta_3 = 0.25$, and $\Delta_2 = 0.5$.

Figure 10:
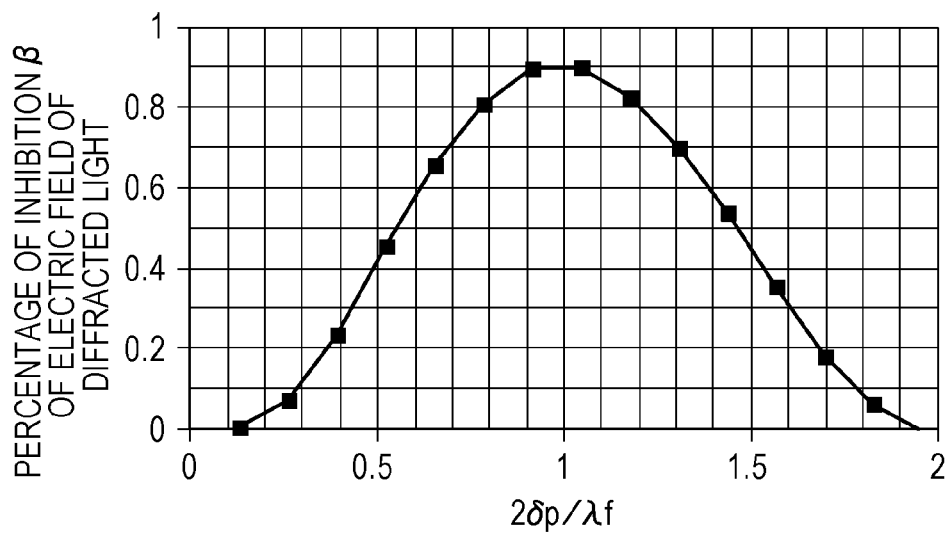
FIG. 10 is a graph showing the results of calculating the relationship between the value of δ and the percentage of inhibition β at a diffracted light electric field according to the second embodiment.

FIG. 10 is a graph illustrating the results of fixing $\Delta_1$ through $\Delta_3$ to the above values, and $\delta_2/\delta_3$ (i.e., $\phi_2/\phi_3$) to 0.5, and calculating the relationship between the value of δ (i.e., $\delta_2 = \delta_3 - \delta_2$) and the percentage of inhibition β of the electric field of diffracted light. The horizontal axis is normalized by dividing the value of δ by λf/2p. β exceeds 0.5 in a case where 2δp/λf is in the range of 0.55 to 1.46, so the electric field of diffracted light is sufficiently suppressed as long as the value of δ is within a range of 0.55×(λf/2p) through 1.46×(λf/2p). That is to say, the electric field of diffracted light is sufficiently suppressed if $\delta_j$ (i.e., δ(j−1)) is in the range of Expression (25).

$$\frac{0.55(j-1)\lambda f}{2p} \leq \delta_f \leq \frac{1.46(j-1)\lambda f}{2p} \qquad \text{Expression (25)}$$

Japanese Patent Laid-Open No. 2013-2819 discloses a light shielding mask where the light transmittance changes in stages from the optical axis toward the perimeter edge portion of the lens, starting at 100%, and then decreasing to 60%, and then 30%. The effects of suppressing electric field of diffracted light due to the microlens having this light shielding mask will be examined here.

Figure 11:
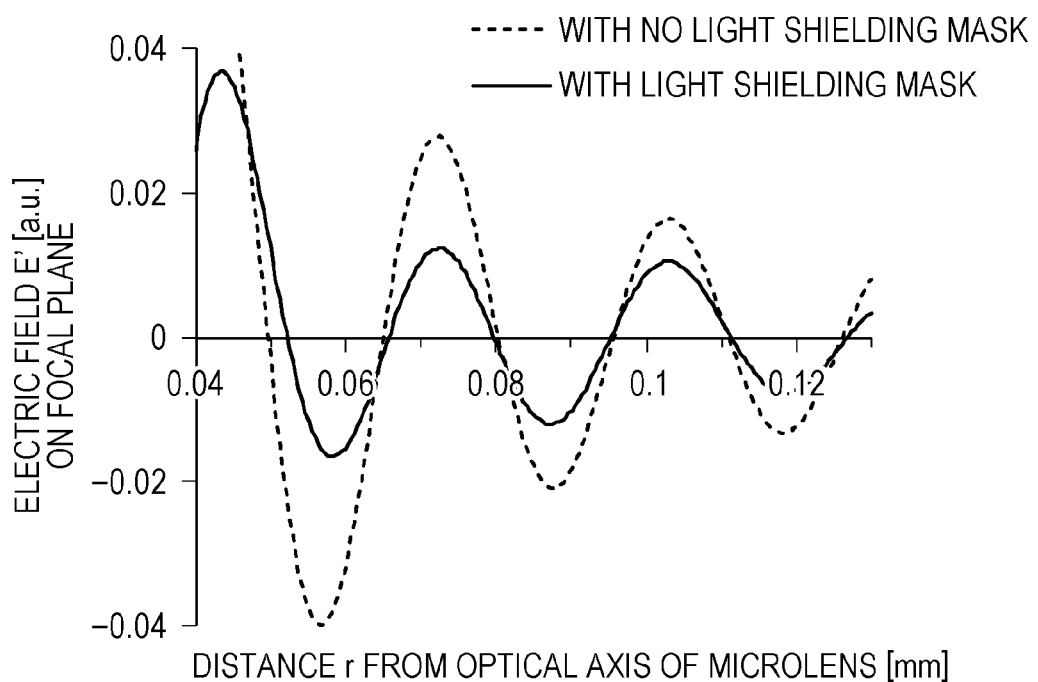
FIG. 11 is a graph illustrating an electric field E'(r) at a focal plane of a microlens, as a comparative example.

FIG. 11 is a graph illustrating the effects of suppressing electric field of diffracted light due to the microlens having the light shielding mask with the conditions described in Japanese Patent Laid-Open No. 2013-2819. N=3 has been set in this mask, which is equivalent to setting $\Delta_1 = 0.548$, $\Delta_2 = 0.227$, and $\Delta_3 = 0.226$. Note that "absolute value of electric field transmission coefficient=√light transmittance" holds here. The solid line in FIG. 11 is the electric field E'(r) at the focal plane of the microlens, that has been obtained by substituting these values into Expressions (8) and (9). $\delta_2$ and $\delta_3$ are set to λf/2p and λf/p respectively, in the same way as in the second embodiment, and the values f=2.4 mm, λ=638 nm, p=0.1 mm, and R=0.05 mm are set.

FIG. 11 illustrates a case where the microlens does not have the light shielding mask and has uniform light transmittance, with the electric field at the focal plane indicated by the dashed line. Having the light shielding mask described in Japanese Patent Laid-Open No. 2013-2819 reduces the electric field of diffracted light nearby r=p=0.1 mm, but the percentage of inhibition has not reached 0.5. The percentage of inhibition β of the electric field of diffracted light calculated by substituting the data of the solid line in FIG. 11 into Expression (6) is 0.45, which is below 0.5. Note that substituting the above parameters into the left side of Expression (15) yields 0.547, so Expression (15) is not satisfied.

The understanding of a light shielding mask of which the light transmittance changes in steps in Japanese Patent Laid-Open No. 2013-2819 has been "an element where the light transmittance gradually becomes smaller from the center of the microlens toward the outer side". This idea alone was not sufficient to arrive at a design of a light shielding mask where the intensity of electric field of diffracted light nearby an adjacent spot can be halved.

On the other hand, the present embodiment understands such a light shielding mask to be "multiple apertures with different diameters", and further understands the electric field on the focal plane of the lens having this light shielding mask to be "a combination of electric fields of diffracted light generated by multiple transparent lenses having different diameters". Based on this idea, Expression (15) has been found as a conditional expression to make the electric field intensity of diffracted light nearby adjacent spots half or lower. In all of the above first and second embodiments, and the following third through ninth embodiments, the electric field intensity of diffracted light nearby adjacent spots is made to be half or lower, by forming the light shielding mask so as to satisfy this Expression (15).

Thus, according to the second embodiment, the light shielding mask 121 is formed so as to satisfy Expression (15) or Expression (16), so diffracted light nearby adjacent spots is suppressed due to the effect of interference of electric fields, in the same way as the first Embodiment.

Third Embodiment

A third embodiment is the same as the first and second embodiments with regard to the points that the SHWS 101 is configured using the MLA 105, and that the MLA 105 has multiple lenses 109 arrayed at a pitch p. The third embodiment differs from the first and second embodiments with regard to the light shielding mask 121 of the lenses 109. The absolute value t of the electric field transmission coefficient of the lens 109 having the light shielding mask 121 exhibits a distribution obtained by substituting $\Delta_1=\Delta_2=\Delta_3=\frac{1}{3}$, $\delta_2=\lambda f/3p$, and $\delta_3=2\lambda f/3p$ into Expression (7).

Figure 12A:
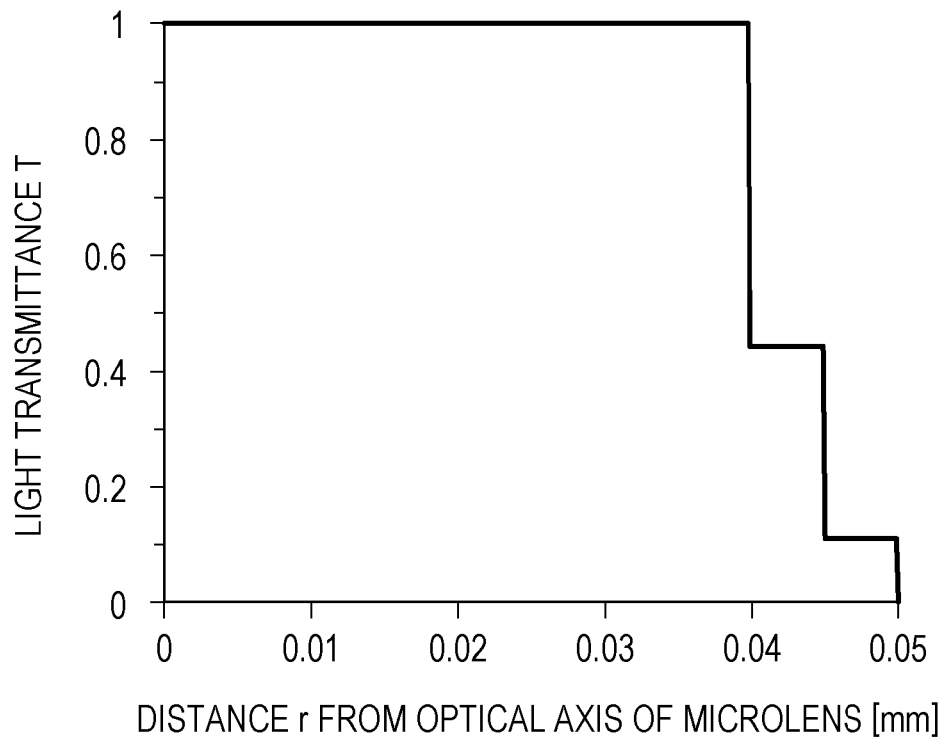
FIGS. 12A and 12B are graphs, FIG. 12A showing light transmittance distribution T(r) of a lens in a third embodiment, and FIG. 12B showing values $u_j$ plotted on a complex plane.

FIG. 12A is a graph illustrating light transmittance distribution T(r) of the lens 109 according to the third embodiment. The values p=0.1 mm, λ=638 nm, f=2.4 mm, and R=0.05 mm are set here. The $u_j$ that is obtained from $\delta_j$ and $\Delta_j$ are set to $u_1=\frac{1}{3}$, $u_2=(\frac{1}{3})\exp(2\pi i/3)$, and $u_3=(\frac{1}{3})\exp(4\pi i/3)$.

Figure 12B:
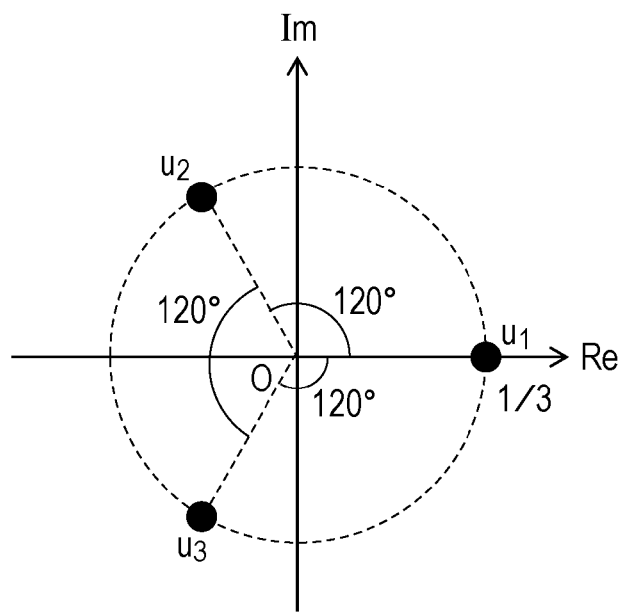

FIG. 12B is a graph where these $u_j$ have been plotted on a complex plane. Each $u_j$ equally have a distance of ⅓ from the origin, and the phases are shifted 120° each. As a result, the total value is 0, thereby satisfying the generalized conditional Expression (14), and further satisfying Expressions (15) and (16) that have been derived from Expression (14). Although $u_j$ was also a real number in the first and second embodiments, such as in FIG. 7 for example, $u_2$ and $u_3$ are complex numbers in the third embodiment.

Finding the electric field E' at the focal plane of the lens 109 from Expressions (8) and (9), and substituting this into Expression (6) yields 0.80 for the percentage of inhibition β of the electric field of diffracted light. It can be seen from these results that the SHWS 101 according to the third embodiment sufficiently suppresses the electric field of diffracted light nearby adjacent spots.

The third embodiment is an example where the $u_j$ are equidistantly placed on a circle centered on the origin on the complex plane. In the above-described example, the number of steps is 3 and the absolute value t of the electric field transmission coefficient at the optical axis 109C (r=0) is 1. Expanding the number of steps to N and t(0) to $t_0$ allows $u_j$, $\Delta_j$, and $\delta_j$ to be expressed as in Expression (26).

$$u_j = \frac{t_0}{N}\exp\left[i\frac{2\pi(j-1)}{N}\right] \quad \text{Expression (26)}$$

$$\Delta_j = \frac{t_0}{N}$$

$$\delta_j = \frac{(j-1)\lambda f}{Np}$$

The $\Delta_j$ and $\delta_j$ obtained by substituting N=3 and $t_0$=1 into Expression (26) matches the above-described values. Further, substituting N=2 and $t_0$=1 into Expression (26) gives $\Delta_1$=0.5, $\Delta_2$=0.5, and $\delta_2=\lambda f/2p$, and the distribution of absolute values of electric field transmission coefficients obtained by substituting these into Expression (7) match the distribution illustrated in FIG. 6B in the first embodiment. That is to say, if N≥2 is set in Expression (26), this is a conditional expression encompassing the first embodiment as well. Thus, the light shielding mask 121 is formed so as to satisfy Expression (15), and more preferably Expression (16), diffracted light nearby adjacent spots is suppressed due to the effect of interference of electric fields, in the same way as the first Embodiment.

No upper limit is set in Expression (26) for N, from a mathematical perspective. However, from the perspective of the cost of manufacturing the MLA 105 N≤20 is desirable.

Fourth Embodiment

A fourth embodiment is the same as the first through third embodiments with regard to the points that the SHWS 101 is configured using the MLA 105, and that the MLA 105 has multiple lenses 109 arrayed at a pitch p. The fourth embodiment differs from the first through third embodiments with regard to the light shielding mask 121 of the lenses 109. The absolute value t of the electric field transmission coefficient of the lens 109 having the light shielding mask 121 exhibits a distribution obtained by substituting N=5, $\Delta_1=\Delta_2=\Delta_4=\Delta_5=\frac{1}{6}$, $\Delta_3=\frac{1}{3}$, $\delta_2=\lambda f/3p$, $\delta_3=2\lambda f/3p$, $\delta_4=\lambda f/p$, and $\delta_5=4\lambda f/3p$ into Expression (7).

Figure 13A:
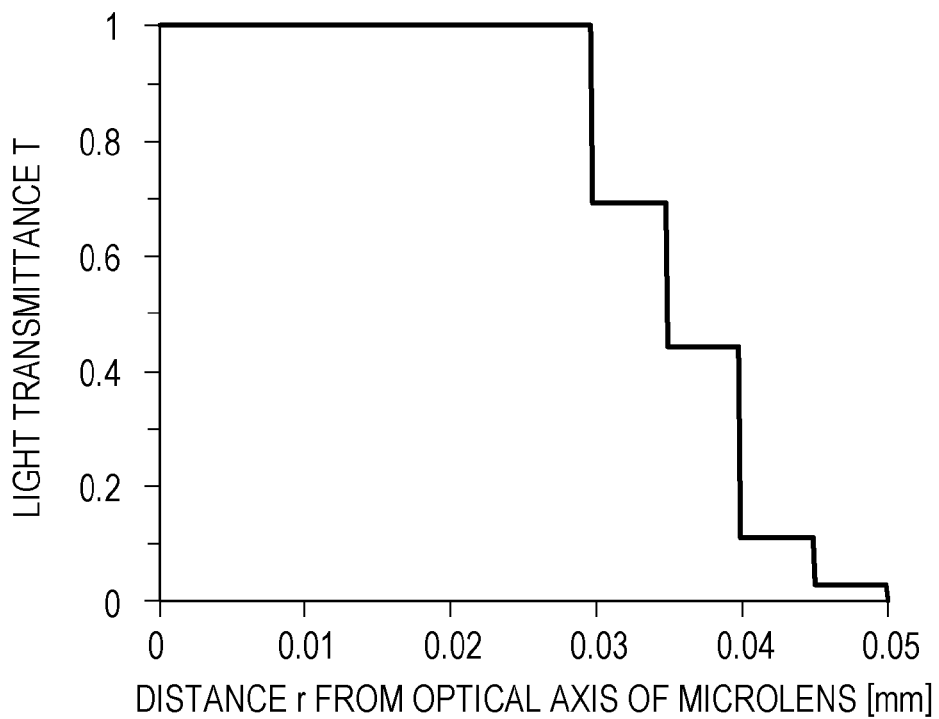
FIGS. 13A and 13B are graphs, FIG. 13A showing light transmittance distribution T(r) of a lens in a fourth embodiment, and FIG. 13B showing values $u_j$ plotted on a complex plane.

FIG. 13A is a graph illustrating light transmittance distribution T(r) of the lens 109 according to the fourth embodiment. The values p=0.1 mm, λ=638 nm, f=2.4 mm, and R=0.05 mm are set here. The $u_j$ that is obtained from $\delta_j$ and $\Delta_j$ are set to $u_1=u_4=\frac{1}{6}$, $u_2=u_5=(\frac{1}{6})\exp(2\pi i/3)$, and $u_3=(\frac{1}{3})\exp(4\pi i/3)$.

Figure 13B:
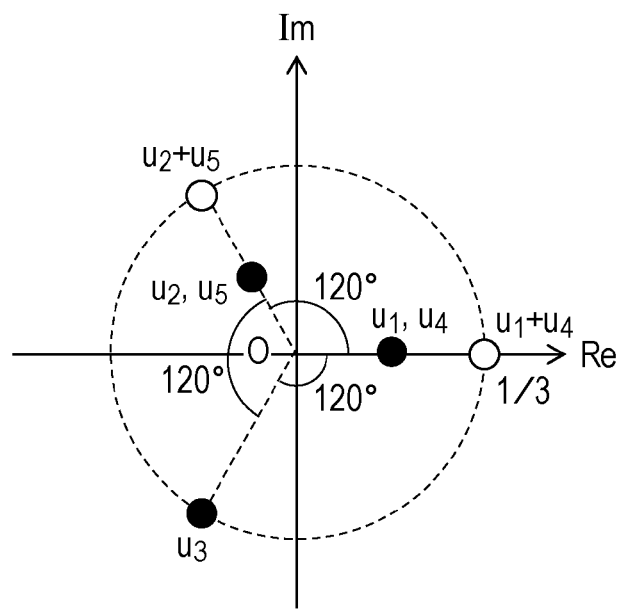

FIG. 13B is a graph where these $u_j$ have been plotted on a complex plane. The phases of $u_j$ are one of 0°, 120°, and 240°, with the total of absolute values of each $u_j$ situated at the same phase being equal at ⅓. Consequently, the total value of $u_1$ through $u_5$ is 0, thereby satisfying the generalized conditional Expression (14).

Finding the electric field E' at the focal plane of the lens 109 from Expressions (8) and (9), and substituting this into Expression (6) yields 0.91 for the percentage of inhibition β of the electric field of diffracted light. It can be seen from these results that the SHWS 101 according to the fourth embodiment sufficiently suppresses the electric field of diffracted light nearby adjacent spots.

The fourth embodiment is an example where the phases of $u_j$ are equidistantly placed, and the absolute values are not uniform. In the above-described example, the number of steps is 5, the phase interval of $u_j$ is 120° and t (r=0)=1. Expanding the number of steps to N, the phase interval of $u_j$ to (360/m)°, and t(0) to $t_0$, allows $\delta_j$ to be expressed as in Expression (27).

$$\delta_j = \frac{(j-1)\lambda f}{mp} \quad \text{Expression (27)}$$

The conditions placed on $\Delta j$ are as shown in Expression (28)

$$\frac{1}{t_0} \sum_{j=1}^{\lfloor (N+k)/m \rfloor} \Delta_{mj-k} = \frac{1}{m} \quad \text{Expression (28)}$$

where [x] represents the largest integer that does not exceed x. Also, m is an integer that is 2 or larger but N or smaller, so Expression (28) satisfies all integers k 0 or larger but smaller than m. Of course, $\delta_j$ obtained by substituting m=3 into Expression (27) matches the above-described value, and an expression obtained by substituting m=3, N=5, and $t_0$=1 into Expression (28) is a conditional expression encompassing the value of the above-described $\Delta_j$.

Also, substituting m=N into Expressions (27) and (28) matches Expression (26) described in the third embodiment that stipulates $\delta_j$ and $\Delta_j$. That is to say, Expressions (27) and (28) are conditional expressions encompassing the third embodiment as well.

Further, substituting m=2 results in Expression (27) matching Expression (17) described in the second embodiment that stipulates $\delta_j$, and in Expression (28) matching an expression obtained by substituting q=0 into Expression (22) described in the second embodiment that stipulates $\Delta_j$. That is to say, Expressions (27) and (28) are conditional expressions encompassing the second embodiment as well.

Now, due to Expression (17) in the second embodiment having been expanded to Expression (27), Expression (25) in the second embodiment is expanded to Expression (29).

$$\frac{0.55(j-1)\lambda f}{mp} \leq \delta_j \leq \frac{1.46(j-1)\lambda f}{mp} \quad \text{Expression (29)}$$

The conditions for approximately halving the electric field of diffracted light are expressed by Expression (15). Substituting Expression (27) into Expression (15) and rewriting into a form including the left side of Expression (28) yields Expression (30).

$$\left| \sum_{k=0}^{m-1} \left[ \frac{1}{t_0} \sum_{j=1}^{\lfloor (N+k)/m \rfloor} \Delta_{mj-k} \exp\left(i\frac{2\pi k}{m}\right) \right] \right| \leq 0.5 \quad \text{Expression (30)}$$

Expression (30) is satisfied as long as Expression (31) is satisfied regarding all integers k 0 or larger but smaller than m.

$$0.5 \leq \frac{m \sum_{j=1}^{\lfloor (N+k)/m \rfloor} \Delta_{mj-k}}{t_0} \leq 1.5 \quad \text{Expression (31)}$$

Accordingly, if $\delta_j$ satisfies Expression (29), and $\Delta_j$ satisfies Expression (31) regarding all integers k 0 or larger but smaller than m, the electric field of diffracted light is suppressed to half or lower nearby adjacent spots, as compared to a case where the microlens is transparent.

Fifth Embodiment

A fifth embodiment is the same as the first through fourth embodiments with regard to the points that the SHWS 101 is configured using the MLA 105, and that the MLA 105 has multiple lenses 109 arrayed at a pitch p. The fifth embodiment differs from the first through fourth embodiments with regard to the light shielding mask 121 of the lenses 109. The absolute value t of the electric field transmission coefficient of the lens 109 having the light shielding mask 121 exhibits a distribution obtained by substituting $\Delta_1=2\sqrt{3}-3$, $\Delta_2=\Delta_3=2-\sqrt{3}$, $\delta_2=5\lambda f/12p$, and $\delta_3=7\lambda f/12p$ into Expression (7).

Figure 14A:
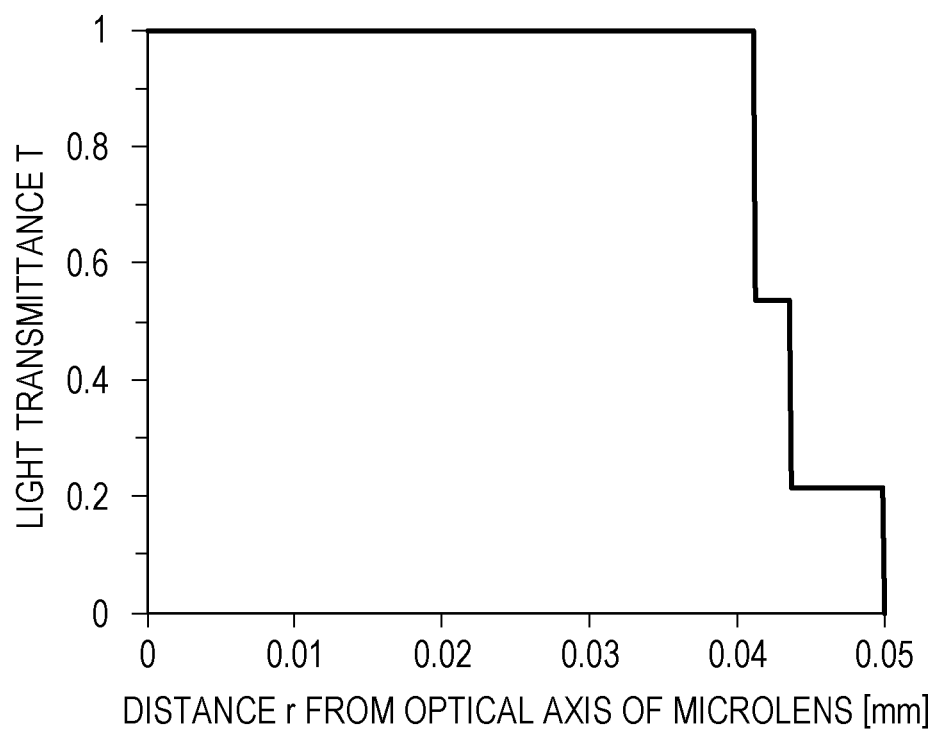
FIGS. 14A and 14B are graphs, FIG. 14A showing light transmittance distribution T(r) of a lens in a fifth embodiment, and FIG. 14B showing values $u_j$ plotted on a complex plane.

FIG. 14A is a graph illustrating light transmittance distribution T(r) of the lens 109 according to the fifth embodiment. The values p=0.1 mm, $\lambda$=638 nm, f=2.4 mm, and R=0.05 mm are set here. Although ($\delta_j-\delta_{j-1}$) was constant in the first through fourth embodiments regardless of j, $\delta_2-\delta_1=\delta_2=5\lambda f/12p$ and $\delta_3-\delta_2=\lambda f/6p$ in the fifth embodiment, and thus is not constant. Further, even if m=3 in Expression (29), the $\delta_2$ and $\delta_3$ in the fifth embodiment do not satisfy this expression. The values of $u_1$, $u_2$, and $u_3$, obtained from $\delta_j$ and $\Delta_j$, are set to $2\sqrt{3}-3$, $(2-\sqrt{3})\exp(5\pi i/6)$, and $(2-\sqrt{3})\exp(7\pi i/6)$, respectively.

Figure 14B:
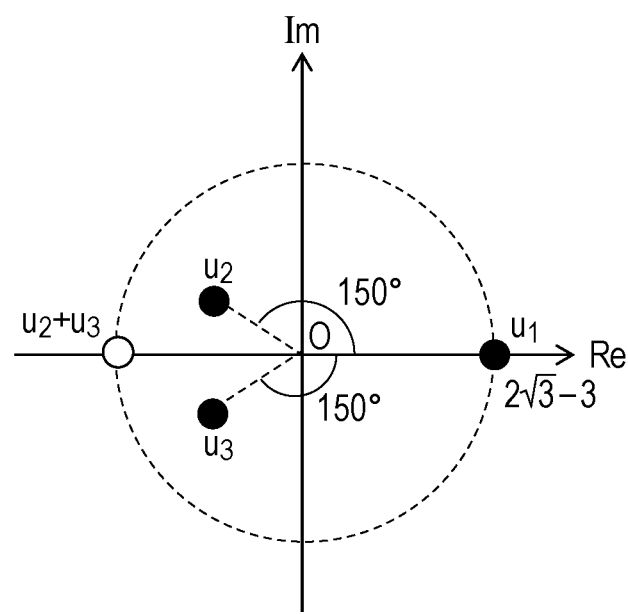

FIG. 14B is a graph where these $u_j$ have been plotted on a complex plane. The absolute values of $u_2$ and $u_3$ are equal, and the phases thereof are 150° and −150°, so $u_2$ and $u_3$ are in a mutually conjugate relationship. As a result, the total of $u_2$ and $u_3$ is $-2\sqrt{3}+3$ which is a real number and is (−1) times $u_1$, so the total value of $u_1$ through $u_3$ is 0, thereby satisfying the generalized conditional Expression (14), and further satisfying Expressions (15) and (16) that have been derived from Expression (14).

Finding the electric field E' at the focal plane of the lens 109 from Expressions (8) and (9), and substituting this into Expression (6) yields 0.75 for the percentage of inhibition β of the electric field of diffracted light. It can be seen from these results that the SHWS 101 according to the fifth embodiment sufficiently suppresses the electric field of diffracted light nearby adjacent spots. It can also be seen that even if ($\delta_j-\delta_{j-1}$) is not constant regardless of j, and Expression (29) is not satisfied, the electric field of diffracted light is suppressed as long as conditional Expressions (14) through (16) are satisfied.

Another example of a case where Expression (29) is not satisfied but the conditional Expressions (14) through (16) are satisfied, is a pattern where $\Delta_1=0.5$, $\Delta_2=\Delta_3=0.25$, $\delta_2=\lambda f/2p$, and $\delta_3=3\lambda f/2p$ is set, and where $u_1=0.5$, and $u_2=u_3=-0.25$.

Sixth Embodiment

A sixth embodiment is the same as the first through fifth embodiments with regard to the points that the SHWS 101 is configured using the MLA 105, and that the MLA 105 has multiple lenses 109 arrayed at a pitch p. The sixth embodiment differs from the first through fifth embodiments with regard to the light shielding mask 121 of the lenses 109.

The absolute value t(r) of the electric field transmission coefficient of the lens 109 having the light shielding mask 121 exhibits the stepped distribution stipulated by Expression (7), in the same way as the other embodiments. Note however, that in the light shielding mask 121 according to the sixth embodiment, the parameters $\Delta_j$ and $\delta_j$ included in Expression (7) assume values where the percentage of inhibition β of the electric field diffracted light is largest.

Design Method of $\Delta_j$ and $\delta_j$

Approximation is made with the lens 109 as a stigmatic lens and the test light entering a single lens 109 being locally planar. The electric field E immediately after transmitting the lens 109 is obtained by Expression (32).

$$E(r) = t(r)\exp\left(-\frac{i\pi r^2}{\lambda f}\right) \quad \text{Expression (32)}$$

The electric field E' at the light-receiving surface 107A of the imaging device 107 can be obtained by performing calculation regarding propagating the electric field E in Expression (32) by a distance f. The angular spectrum method using Expression (33), for example, is used as a propagation model (see J. W. Goodman, "Introduction to Fourier Optics 2nd Edition", McGraw-Hill, p 55- (1996)).

$$E'(r) = \int\int\left[\int\int E\left(\sqrt{\xi^2+\eta^2}\right)e^{2\pi i(\xi v_x + \eta v_y)}d\xi d\eta\right]$$
$$e^{\frac{2\pi i f}{\lambda}\sqrt{1-\lambda^2(v_x^2+v_y^2)}} e^{2\pi i r v_x} dv_x dv_y \quad \text{Expression (33)}$$

Note however, in a case where the distance l between the light-receiving surface 107A and the MLA 105 is deviated from f, f→l is undesirable in Expression (33). The propagation model is not restricted to the angular spectrum method, and any model may be used that can correctly calculate wavefront propagation, such as the Finite-Difference Time-Domain method for example.

In the sixth embodiment, $\Delta_j$ and $\delta_j$ are numerically calculated to yield the largest percentage of inhibition β of electric field of diffracted light, obtained by substituting Expression (7) into Expression (32), further substituting this into Expression (33), and further substituting this into Expression (6). Accordingly, initial values need to be input for $\Delta_j$ and $\delta_j$ for the numerical calculation; values calculated by Expressions (17) and (24), for example, may be used.

As an example, Table 2 shows the values of $\Delta_j$ and $\delta_j$ designed according to the above method, with the values set to λ=638 nm, f=2.4 mm, p=0.1 mm, R=0.05 mm, N=6, and α=0.5.

TABLE 2

| j | $\Delta_j$ | $\delta_j$ (mm) |
|---|---|---|
| 1 | 0.044 | 0.0000 |
| 2 | 0.170 | 0.0078 |
| 3 | 0.298 | 0.0158 |
| 4 | 0.299 | 0.0234 |
| 5 | 0.158 | 0.0308 |
| 6 | 0.030 | 0.0388 |

Substituting these values into the left side of the generalized conditional expression (14) in the first embodiment gives 0.005, thereby satisfying Expression (14) and the Expressions (15) and (16) derived therefrom. Also, the values of $2p\delta_j/\lambda f(j-1)$ for each of j=2 through 6, calculated from $\delta_j$ in Table 2, are in the range of 1.01 to 1.03, so these $\delta_j$ satisfy the Expression (25) according to the second embodiment.

Further, $\Delta_1+\Delta_3+\Delta_5$, and $\Delta_2+\Delta_4+\Delta_6$, calculated from $\Delta_j$ in Table 2, are each 0.500 and 0.500, thereby satisfying an expression obtained by substituting on of (k, m)=(0, 2), (1, 2) into Expression (31) in the fourth embodiment.

That is to say, even if $\Delta_j$ and $\delta_j$ are optimized by being numerically calculated, values straying from Expressions (14) through (16), (25), and (31) are not calculated. It can thus be seen that these expressions are conditional expressions encompassing the sixth embodiment.

In the sixth embodiment, the $\Delta_j$ and $\delta_j$ calculated by the above-described technique are substituted into Expressions (7), thereby obtaining a distribution t(r) of absolute values of electric field transmission coefficients that the lens 109 should exhibit. This is further squared, to obtain the light transmittance distribution T(r) that the lens 109 should exhibit.

Figure 15A:
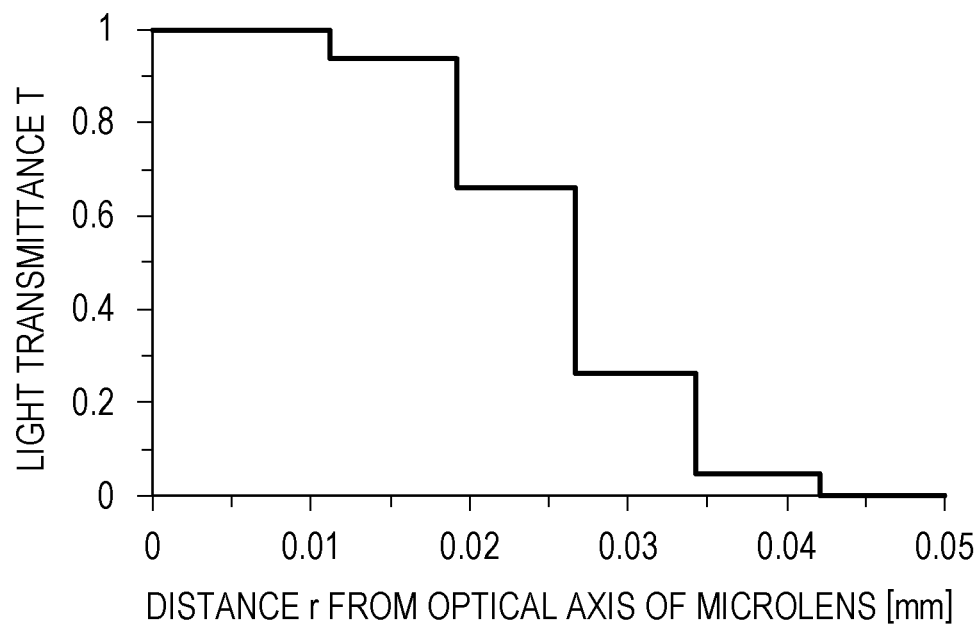
FIGS. 15A and 15B are graphs, FIG. 15A showing light transmittance distribution T(r) of a lens in a sixth embodiment, and FIG. 15B showing the results of simulating the relationship between incident wavefront curvature and spot detection error.

FIG. 15A is a graph illustrating the light transmittance distribution T(r) of the lens 109, obtained from the $\Delta_j$ and $\delta_j$ in Table 2. A light shielding mask 121 exhibiting such a light transmittance distribution is formed on the lens member 111.

Advantages of Light Shielding Mask

An electric field E'(r) at the focal plane was obtained from Expression (33) regarding a lens 109 exhibiting the light transmittance distribution in FIG. 15A, and thereafter the percentage of inhibition β of the electric field of diffracted light was obtained thereafter with α=0.5 in Expression (6), giving a percentage of inhibition β of 0.95. These results show that the SHWS 101 (MLA 105) according to the sixth embodiment sufficiently suppresses the electric field of diffracted light nearby adjacent spots.

Simulation was further performed regarding a lens 109 having the light transmittance distribution illustrated in FIG. 15A (i.e., provided with the light shielding mask 121), and a case where the distribution is uniform (i.e., not having the light shielding mask 121), to simulate spot detection error at the SHWS 101. Spot detection error is dependent on the curvature of the incident test light wavefront, so the relationship between wavefront curvature and spot detection error was obtained in this simulation. The pixel pitch $p_{CCD}$ of the imaging device 107 was 7.4 μm.

Figure 15B:
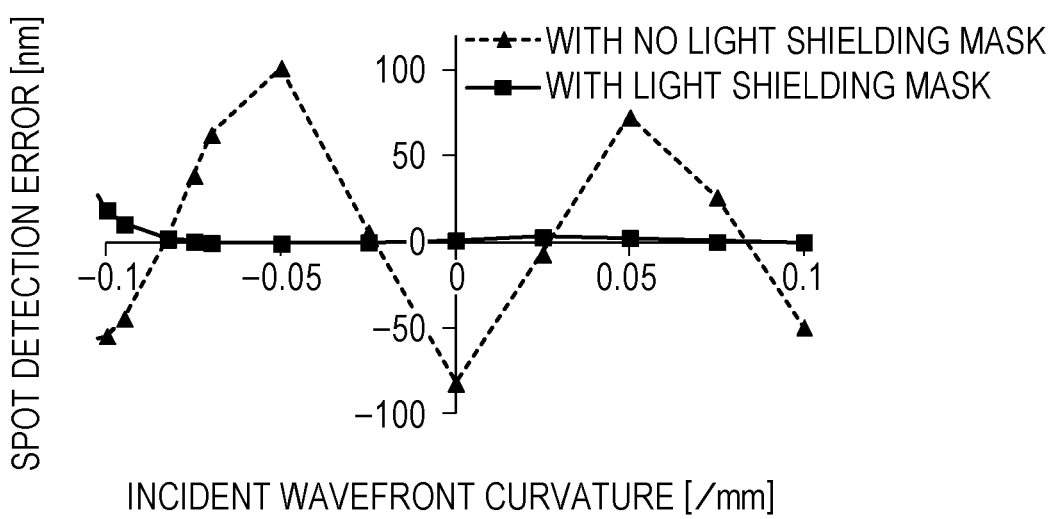

FIG. 15B is a graph illustrating the simulation results representing the relationship between incident wavefront curvature and spot detection error, with regard to the SHWS using the MLA made up of microlenses exhibiting the light transmittance distribution illustrated in FIG. 15A. The horizontal axis has the wavefront curvature of convergent light plotted on the negative side and the wavefront curvature of divergent light plotted on the positive side. In a case where the lens 109 has uniform light transmittance distribution, there are spot detection errors close to 100 nm occurring, while spot detection errors are suppressed to 20 nm or lower for the light transmittance distribution illustrated in FIG. 15A. It can be seen from these results that the precision is markedly improved in the SHWS 101 according to the sixth embodiment.

Performance-Wise Advantages as Compared to Gaussian Mask

A Gaussian mask exhibiting Gaussian distribution where the light transmittance is smooth from the optical axis to the perimeter edge portion will be considered as a light shielding mask according to a comparative example. According to the Fresnel diffraction equation, the electric field E on the lens face and the electric field E' on the focal plane are in a relationship of Fourier transform with each other. If the light transmittance T of the microlens exhibits Gaussian distribution, the absolute value t of the electric field transmission coefficient will also exhibit Gaussian distribution, and the electric field E on the lens face will also exhibit Gaussian distribution. Gaussian distribution subjected to Fourier transform still is Gaussian distribution, so if the electric field E at the lens face exhibits Gaussian distribution, the electric field E' on the focal plane also will exhibit Gaussian distribution. Consequently, the electric field of diffracted light indicating the cyclic spatial distribution on the focal plane will be suppressed as compared to a case where the light transmittance of the microlens is uniform.

However, the radius R of the microlens is finite. Even if a Gaussian mask is introduced, the Gaussian distribution can only be expressed in the electric field on the lens face within the circular region of the radius R, so the Gaussian distribution is incomplete. Consequently, the electric field at the focal plane does not exhibit complete Gaussian distribution, either. Specifically, the electric field on the lens face will change in level in a stepped manner at position r=R, and an electric field of diffracted light exhibiting cyclic spatial distribution due to this will occur at the focal plane.

In order to maximally suppress the electric field of diffracted light, the width σ of Gaussian distribution of the Gaussian mask can be reduced to suppress the difference in level in electric field at r=R on the lens face. However, reducing σ increases the width σ' spatial distribution of the electric field at the focal plane. This σ' is generally synonymous with the spot diameter. A large spot diameter results in the spots overlapping when the convergent light enters the SHWS, so position detection precision thereof markedly deteriorates. This means that the SHWS cannot measure convergent light, and the dynamic range suffers. That is to say, it is difficult to realize both measurement precision and dynamic range with an SHWS configured using an MLA having a Gaussian mask.

Figure 16A:
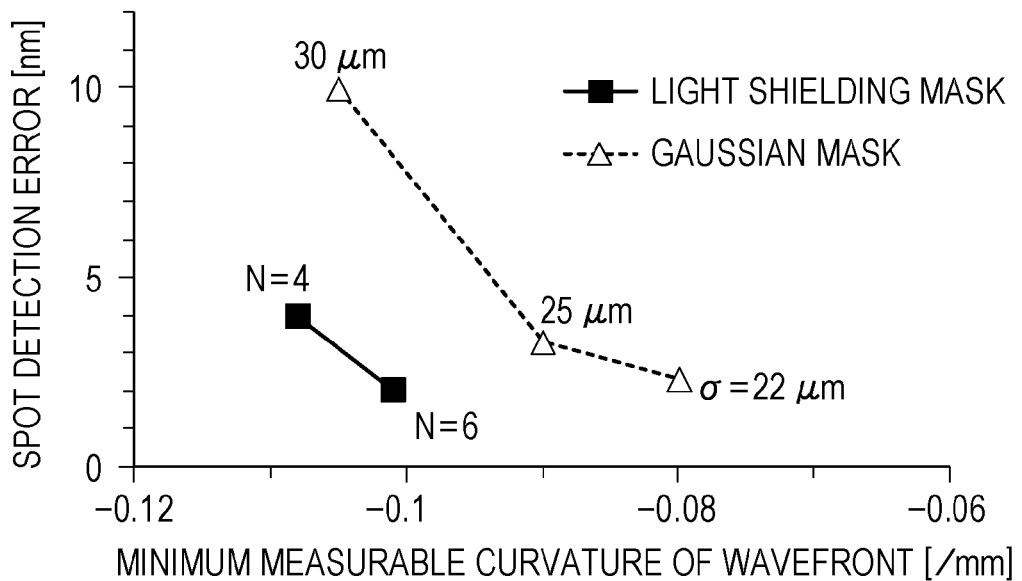
FIGS. 16A and 16B are graphs showing simulation results, FIG. 16A of the smallest wavefront curvature measurable by a SHWS and spot detection error, and FIG. 16B of the electric field intensity at the focal plane.

FIG. 16A is a graph illustrating the results of simulating the smallest wavefront curvature measureable by the SHWS (dynamic range) and spot detection error (measurement precision). The white triangles in FIG. 16A represent cases where σ is 22 μm, 25 μm, and 30 μm. The relationship between σ and electric field transmission coefficient t'(r) of the Gaussian mask was t'(r)=exp(-r²/σ²). Simulation was performed based on Expressions (32) and (33) under the conditions λ=638 nm, f=2.4 mm, p=0.1 mm, R=0.05 mm, and $p_{ccd}$=7.4 μm. The wavefront curvature dependency of the spot detection error was calculated in the range of −0.1 to 0.1/mm, and the average value of the absolute values thereof was plotted on the vertical axis. It can be seen from these simulation results that the measurement precision and dynamic range are in a tradeoff relationship.

In comparison with this, the black squares in FIG. 16A show the results of simulating the smallest wavefront curvature measureable by the SHWS 101 and spot detection error, in a case of being provided with the light shielding mask 121 designed using the technique according to the sixth embodiment, where N=4 and 6. For example, in a case where the light shielding mask 121 where N=6 is provided, the spot detection error of the SHWS is around the same level in comparison of the case having the Gaussian mask where σ=22 μm, but the smallest measureable wavefront curvature is lower, so the dynamic range is higher. That is to say, the light shielding mask 121 is more advantageous in comparison with the Gaussian mask from the perspective of realizing both measurement precision and ensured dynamic range.

Figure 16B:
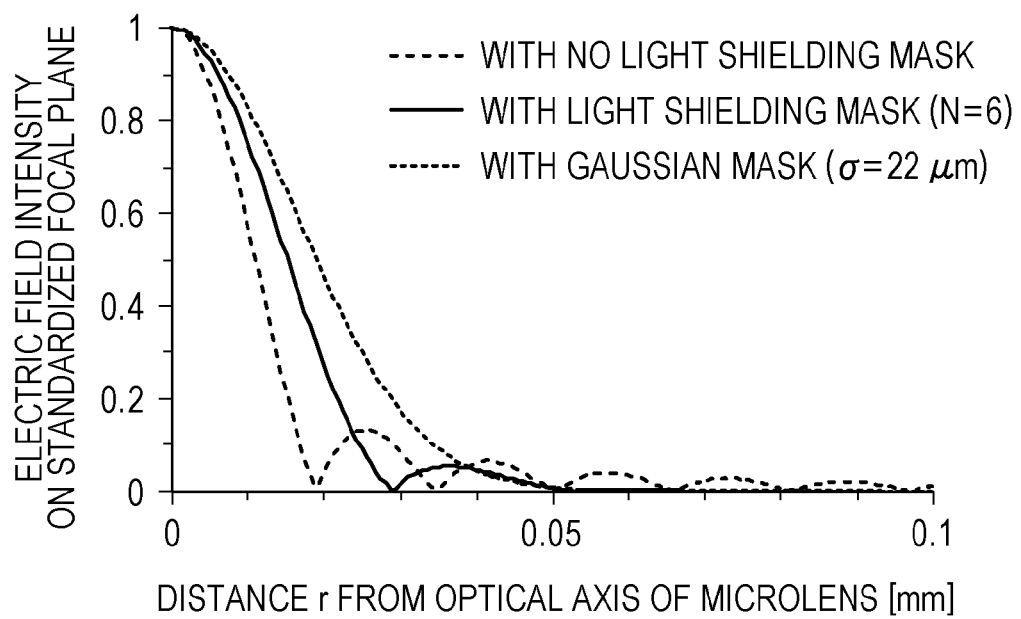

FIG. 16B is a graph illustrating results of simulating electric field intensity at the focal plane. The solid line, dotted line, and dashed line in FIG. 16B respectively indicate a case where the light shielding mask 121 where N=6 is provided, a case having the Gaussian mask where σ=22 μm, and a case of having no light shielding mask. The spot diameter increases in both cases where light shielding masks are provided as compared to the case of not having a light shielding mask, but the amount of increase is suppressed by the light shielding mask 121. Thus, the sixth embodiment enables the spot diameter to be suppressed, and both improved measurement precision and ensured dynamic range of the light shielding mask 121 can be realized.

Seventh Embodiment

Figure 17A:
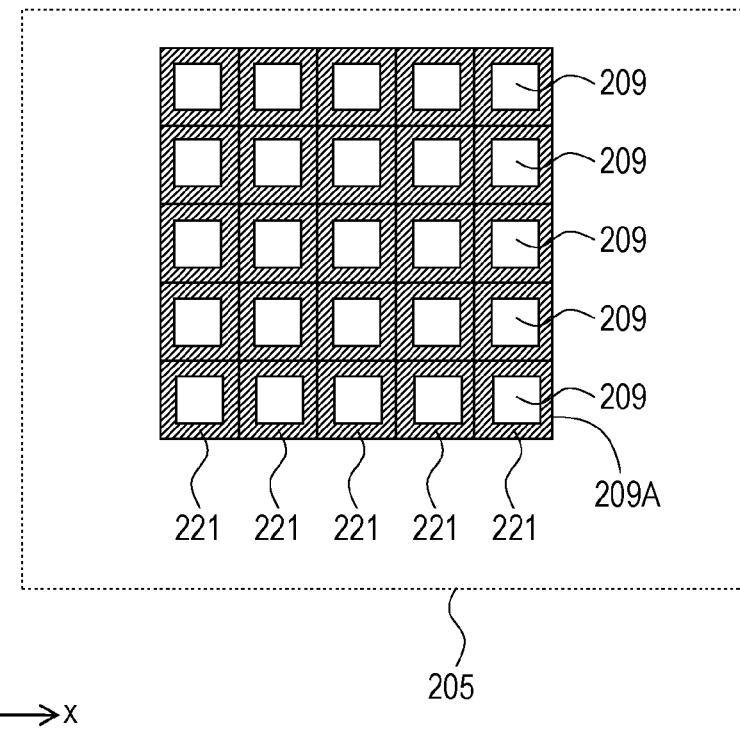
FIGS. 17A and 17B are diagrams of a lens array according to a seventh embodiment, where
Figure 17B:
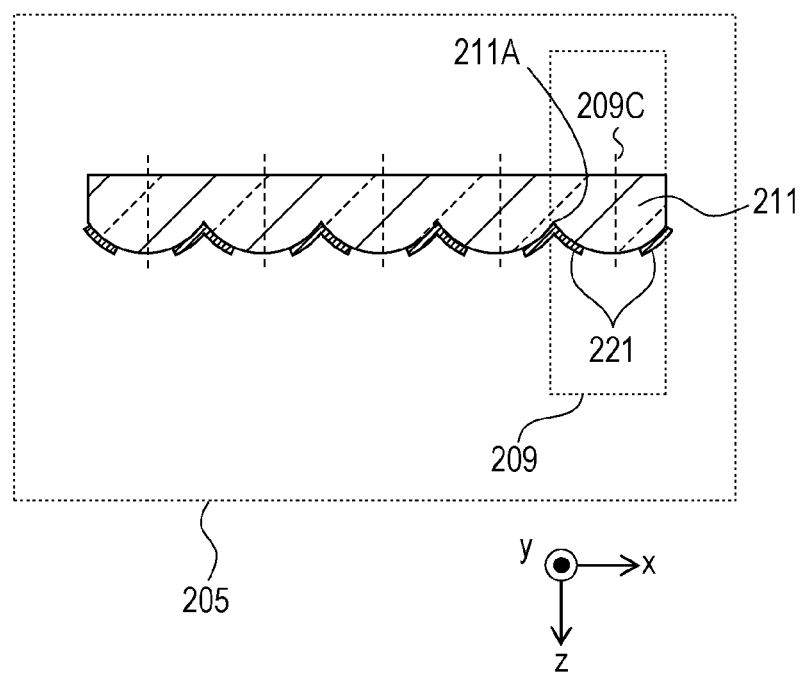

A seventh embodiment differs from the first through sixth embodiments with regard to the point that the SHWS 101 has an MLA 205 instead of the MLA 105. FIGS. 17A and 17B are diagrams of the MLA 205, where FIG. 17A is a frontal view and FIG. 17B is a cross-sectional view.

The MLA 205 has multiple microlenses (lenses) 209 that collect divided test light and form multiple light spots. The multiple lenses 209 are arrayed (square array) in an X-Y plane illustrated in FIG. 17A.

Optical axes 209C of the lenses 209 are disposed parallel to the Z direction. The perimeter edge portions 209A of the lenses 209 (perimeter edge portions 211A of lens members 211) are polygonal, rectangular in the case of the seventh embodiment. The focal length of each lens 209 is f. The size of each lens 209 is $p_x \times p_y$. The optical axes 209C of the lenses 209 are equidistantly arrayed at a pitch $p_x$ in the X-direction and pitch $p_y$ in the Y-direction.

Each lens 209 has a lens member 211 that is formed from a transparent member, and a light shielding mask 221 that is a light shielding member provided corresponding to the lens member 211, as illustrated in FIG. 17B. The light shielding mask 221 is provided along with the lens face on the lens member 211 on the emitting side of the lens member 211, i.e., on the side of the lens member 211 through which light has passed through. The light shielding mask 221 is formed of a Cr film (metal film).

In an arrangement where the optical axis 209C of the lens 209 is at the origin of the X-Y plane, and $\delta_{x,2}=\lambda f/2p_x$ and $\delta_{y,2}=\lambda f/2p_y$ hold, the light shielding mask 221 is formed in a region satisfying one or the other of $|x| \geq p_x/2 - \delta_{x,2}$ and $|y| \geq p_y/2 - \delta_{y,2}$. The light transmittance is 0.25, and the absolute value of electric field transmission coefficient is 0.5. The lens 209 exhibits a two-stepped light transmittance distribution as a result of this light shielding mask 221.

Now, with $p=p_x$, substituting $\delta_2=\delta_{x,2}$, and $\Delta_1=\Delta_2=0.5$ into the left side of Expression (14) described in the first embodiment yields 0, so Expression (14) and the Expressions (15) and (16) derived therefrom are satisfied. Similarly, with $p=p_y$, substituting $\delta_2=\delta_{y,2}$, and $\Delta_1=\Delta_2=0.5$ into the left side of Expression (14) also yields 0, so Expression (14) is satisfied here as well. That is to say, Expression (14) is a conditional expression encompassing the seventh embodiment as well.

When light, having electric field intensity $E_0$ made up from planar waves, perpendicularly enters a rectangular lens of which the light transmittance is uniformly 1 over the entire face, the electric field $E_0'$ at the focal plane is approximated as shown in Expression (34) by Fresnel diffraction equation (see Tadao Tsuruta, "Applied Optics I", Baifukan, 1990).

$$E_0'(x, y) \approx \frac{\lambda f E_0}{\pi^2 xy} \sin\left(\frac{\pi p_x}{\lambda f}x\right)\sin\left(\frac{\pi p_y}{\lambda f}y\right) \quad \text{Expression (34)}$$

According to this expression, in a case where the lens 209 does not have the light shielding mask 221 and has a uniform light transmittance distribution, a strong electric field of diffracted light occurs near line x=0 and near line y=0 on the focal plane. Conversely, the electric field E' on the focal plane of a lens 209 having the light shielding mask 221 is approximated as shown in Expression (35).

$$E'(x, y) \approx \frac{\lambda f E_0}{2\pi^2 xy} \left\{ \sin\left(\frac{\pi p_x}{\lambda f} x\right) \sin\left(\frac{\pi p_y}{\lambda f} y\right) + \sin\left[\left(\frac{\pi p_x}{\lambda f} - \frac{\pi}{p_x}\right) x\right] \sin\left[\left(\frac{\pi p_y}{\lambda f} - \frac{\pi}{p_y}\right) y\right] \right\}$$

Expression (35)

The electric fields E'(0,y) and E'(x,0) on the lines x=0 and y=0 are calculated as shown in Expression (36) by substituting x=0 and y=0 into Expression (35).

$$E'(0, y) \approx \frac{p_x E_0}{2\pi y} \left\{ \sin\left(\frac{\pi p_y}{\lambda f} y\right) + \sin\left[\left(\frac{\pi p_y}{\lambda f} - \frac{\pi}{p_y}\right) y\right] \right\}$$

$$E'(x, 0) \approx \frac{p_y E_0}{2\pi x} \left\{ \sin\left(\frac{\pi p_x}{\lambda f} x\right) + \sin\left[\left(\frac{\pi p_x}{\lambda f} - \frac{\pi}{p_x}\right) x\right] \right\}$$

Expression (36)

The two sine terms within the braces are shifted π from each other at the position (x, y)=(0, ±$p_y$), (±$p_x$, 0) where adjacent spots appear, and cancel each other out. The diffracted light electric field E' nearby adjacent spots is thus suppressed by these effects of interference by electric fields.

According to the seventh embodiment, diffracted light nearby adjacent spots is suppressed due to the effect of interference of electric fields, in the same way as in the above embodiments.

The MLA 205 does not have the connecting member 112 described in the first embodiment, so there is no need to have the light shielding connecting portion 122, and a greater amount of light enters the imaging device 107 as compared to the first embodiment. As a result, the wavefront of the test light can be measured with high precision, even in a case where the light intensity of the test light is weak.

The perimeter edge portions of the lenses may be made polygonal in the second through sixth embodiments in the same way as in the seventh embodiment, and the same advantages are yielded. Although description has been made where the polygon is a rectangle (square), this is not restrictive, and may be triangles or hexagons, for example.

Eighth Embodiment

Shape Measurement Apparatus

Figure 18:
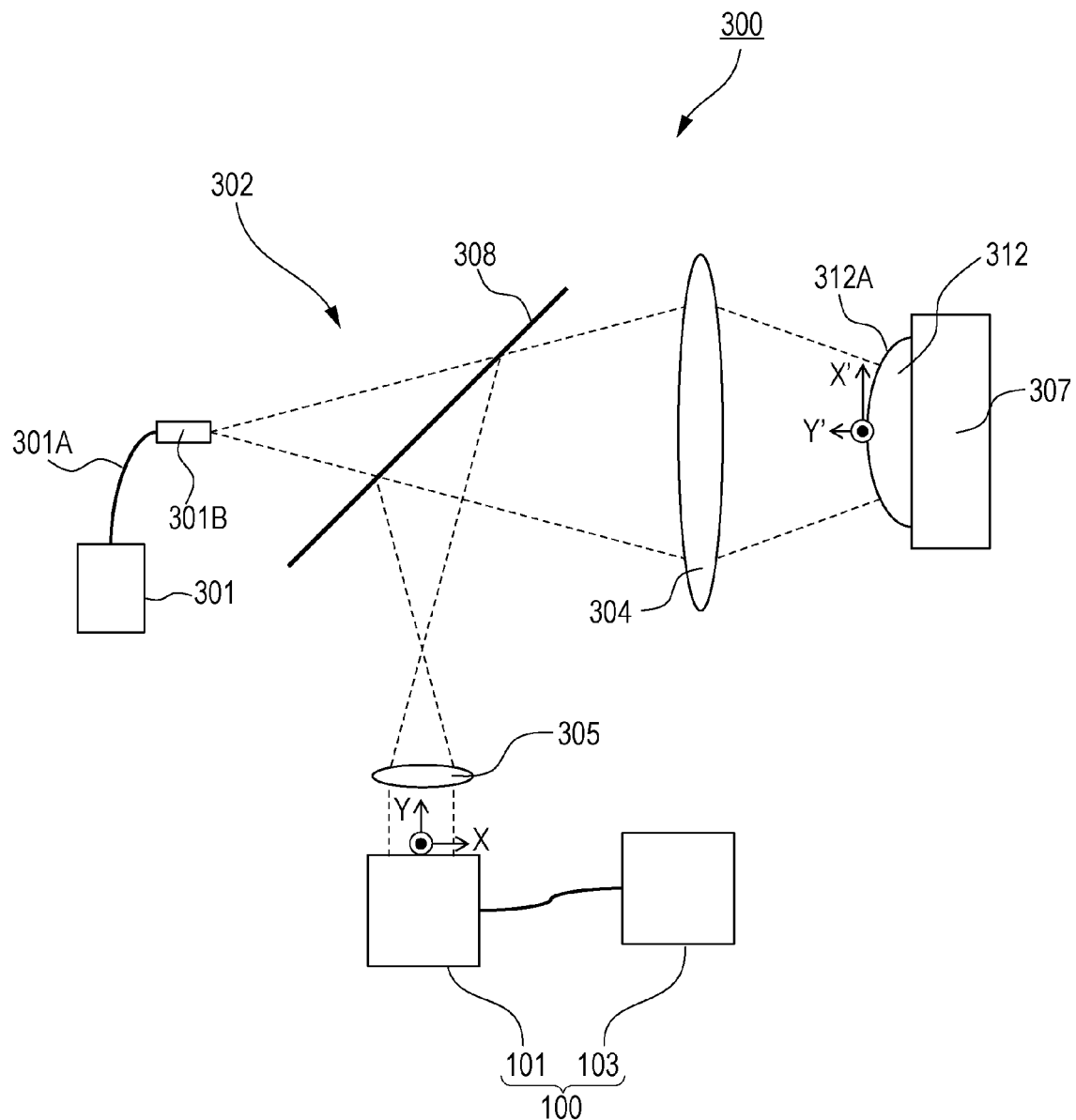
FIG. 18 is a schematic diagram illustrating a shape measurement apparatus including a SHWS, according to an eighth embodiment.

A shape measurement apparatus having the wavefront measurement apparatus described in the first through seventh embodiments will be described in an eighth embodiment. FIG. 18 is a schematic diagram illustrating a shape measurement apparatus 300 according to the eighth embodiment of the present invention. The shape measurement apparatus 300 measures the surface shape of aspherical optical elements.

The shape measurement apparatus 300 includes a light source 301, an optical system 302, and the wavefront measurement apparatus 100. The wavefront measurement apparatus 100 includes the SHWS 101 that is a wavefront sensor, and the computing device 103. The SHWS 101 has the MLA 105 or MLA 205 described in the first through seventh embodiments. A subject lens 312 that is an object to be tested (optical element) is held at a stage 307, and the position and attitude thereof is adjusted by the stage 307. The optical system 302 guides light from the light source 301 to the subject lens 312, and guides light reflected at the subject lens 312 to the wavefront measurement apparatus 100 as test light.

The light source 301 is connected to a fiber connector 301B by an optic fiber 301A, so that emitted light of the light source 301, guided through the optic fiber 301A, is emitted from the fiber connector 301B. The optical system 302 according to the eighth embodiment is made up of a beam splitter 308, an object lens 304, and a collimator lens 305. The beam splitter 308 and object lens 304 are disposed on the optical axis of the measurement light (emitted light) emitted from the fiber connector 301B, and the reverse face of the beam splitter 308 is disposed included 45° as to the optical axis.

The collimator lens 305 is disposed between the beam splitter 308 and SHWS 101, orthogonal to the optical axis of the measurement light (emitted light) emitted from the fiber connector 301B. The object lens 304 collects the emitted light from the fiber connector 301B and irradiates a subject face 312A of the subject lens 312 of which the shape is to be measured, by spherical wave $w_0$ (X', Y') light, and collects the reflected light thereof. The beam splitter 308 bends 90° the reflected light from the subject face 312A that has been collected by the object lens 304, and guides to the collimator lens 305. The collimator lens 305 converts the reflected light into generally parallel light, and guides to the SHWS 101 as test light.

The object lens 304 and collimator lens 305 image the reflected light from the subject face 312A on the light-receiving surface of the SHWS 101 at a magnification of M. That is to say, the subject face 312A and light-receiving surface of the SHWS 101 are in an optically conjugate positional relationship via the collimator lens 305 and object lens 304.

The computing device 103 calculates the wavefront data of the test light, and calculates the shape of the subject face 312A based on the wavefront data.

Manufacturing Method of Optical Element

First, an unshown processing device is used to process a work, and a subject lens 312 that is an optical element is fabricated (processing step). Next, the shape of the subject lens 312 is measured using the shape measurement apparatus 300.

At the time of measuring the shape f'(X', Y') of the subject face 312A of the subject lens 312 using the shape measurement apparatus 300, first, the subject lens 312 is placed on the stage 307, and the position and attitude of the subject lens 312 is adjusted by the stage 307 so that the optical axis thereof matches the optical axis of the object lens 304. At this time, the shape of the subject face 312A is reflected in the wavefront of light reflected off of the subject face 312A. This reflected light enters the SHWS 101, and since the subject face 312A and the light-receiving surface of the SHWS 101 are in a conjugate positional relationship, the shape of the subject face 312A is reflected in the light wavefront entering the SHWS 101.

After the subject lens 312 is set on the stage 307, the light wavefront w(X, Y) reflecting the shape of the subject face 312A that is entering the SHWS 101 is measured following the procedures described in the first embodiment. Thereafter, the shape f' of the subject face 312A is calculated by the computing device 103, where f'(X', Y')=(w(X/M, Y/M)−$w_0$(X', Y'))/2. Note that this computing may be performed by a separate computing device from the computing device 103 that calculates the wavefront data from spot images, in which case the computing unit is made up of these computing devices.

When calculating the shape of the subject face 312A, an arrangement may be made where the light ray is traced backwards from the light ray angle distribution (∂w(X, Y)/∂X, ∂w(X, Y)/∂Y) measured by the SHWS 101 and the light ray angle distribution immediately after reflection at the subject face 312A is obtained, from where the shape of the subject face 312A is obtained. Now, when handling light as waves, the equiphase plane is equivalent to the wavefront, the normal line of the wavefront is the light ray, and the wavefront and the light ray angle distribution correspond in a one-to-one manner. Accordingly, even if the wavefront w(X, Y) is not obtained, obtaining the light ray angle distribution (∂w(X, Y)/∂X, ∂w(X, Y)/∂Y) is synonymous to having obtained the wavefront.

The SHWS 101 has the light shielding mask 121 (221), so spot detection error due to diffracted light is reduced, and highly precise wavefront measurement can be performed. The shape measurement apparatus 300 measures the reflected light wavefront of the subject face 312A using this high-precision SHWS 101, and calculates the shape of the subject face 312A based upon this, and accordingly can realize high-precision shape measurement.

Note that determination may be made regarding whether manufactured subject lenses 312 are acceptable or not based on the shape data acquired by the shape measurement apparatus 300, and display the results on a monitor that is omitted from illustration. Shape error due to manufacturing error may be found from the shape data, and processing performed to reduce the value of the shape error.

Ninth Embodiment

Figure 19:
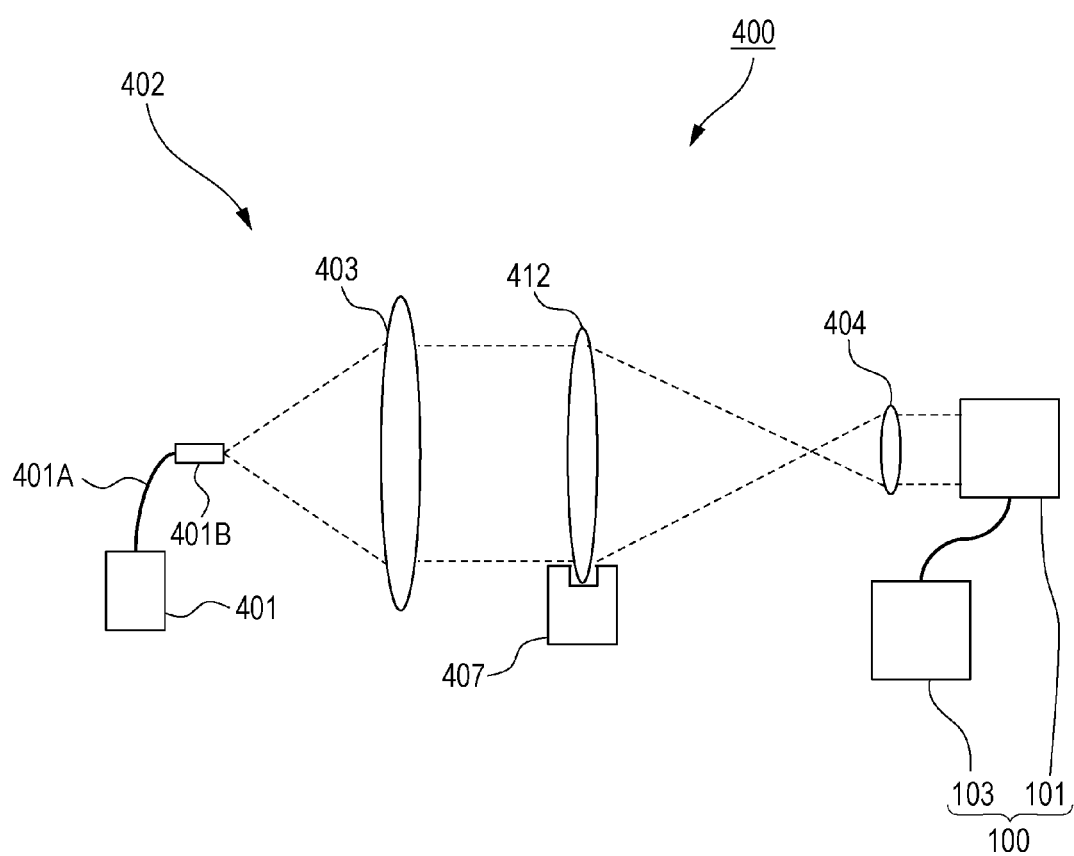
FIG. 19 is a schematic diagram illustrating an aberration measurement apparatus including a SHWS, according to a ninth embodiment.

In a ninth embodiment, an aberration measurement apparatus having the wavefront measurement apparatus described in the first through seventh embodiments will be described. FIG. 19 is a schematic diagram illustrating an aberration measurement apparatus 400 according to the ninth embodiment of the present invention. The aberration measurement apparatus 400 measures aberration of a subject lens 412 that is an object to be tested (optical element).

The aberration measurement apparatus 400 has a light source 401, an optical system 402, and the wavefront measurement apparatus 100. The wavefront measurement apparatus 100 includes the SHWS 101 that is a wavefront sensor, and the computing device 103. The SHWS 101 has the MLA 105 or MLA 205 described in the first through seventh embodiments. A subject lens 412 that is an object to be tested (optical element) is held at a stage 407, and the position and attitude thereof is adjusted by the stage 407. The optical system 402 guides light from the light source 401 to the subject lens 412, and guides light reflected at the subject lens 412 to the wavefront measurement apparatus 100 as test light.

The light source 401 is connected to a fiber connector 401B by an optic fiber 401A, so that emitted light of the light source 401, guided through the optic fiber 401A, is emitted from the fiber connector 401B. The optical system 402 according to the ninth embodiment is made up of collimator lenses 403 and 404.

The collimator lenses 403 and 404 are disposed on the optical axis of the measurement light (emitted light) emitted from the fiber connector 401B. The subject lens 412 is disposed between the collimator lens 403 and collimator lens 404.

The collimator lens 403 collimates the emitted light from the fiber connector 401B and guides to the subject lens 412. The collimator lens 404 collimates the light that has passed through the subject lens 412, and guides to the SHWS 101.

The computing device 103 calculates the wavefront data of the light that has passed through the collimator lens 404. The computing device 103 then calculates aberration data of the subject lens 412 based on the wavefront data.

Manufacturing Method of Optical Element

First, an unshown processing device is used to process a work, and a subject lens 412 that is an optical element is fabricated (processing step). Next, the aberration of the subject lens 412 is measured using the aberration measurement apparatus 400.

At the time of measuring the aberration of the subject lens 412, the subject lens 412 is placed on the stage 407, and the position and attitude of the subject lens 412 is adjusted by the stage 407 so that the optical axis thereof matches the optical axis of the collimator lenses 403 and 404. Thereafter, the wavefront of light entering the SHWS 101 is measured following the procedures described in the first embodiment, and the aberration of the subject lens 412 is calculated from the wavefront data by the computing device 103. Note that this computing may be performed by a separate computing device from the computing device 103 that calculates the wavefront data from spot images, in which case the computing unit is made up of these computing devices.

The SHWS 101 has the light shielding mask 121 (221), so spot detection error due to diffracted light is reduced, and highly precise wavefront measurement can be performed. The aberration measurement apparatus 400 measures the transmitted light wavefront of the subject lens 412 using this high-precision SHWS 101, and thus can realize high-precision aberration measurement.

Note that determination may be made regarding whether manufactured subject lenses 412 are acceptable or not based on the aberration data acquired by the aberration measurement apparatus 400, and display the results on a monitor that is omitted from illustration, and processing may be performed to reduce the aberration.

Further, the manufactured subject lens may be subjected to shape measurement and aberration measurement using the shape measurement apparatus 300 according to the eighth embodiment and the aberration measurement apparatus 400 according to the ninth embodiment.

The present invention is not restricted to the above-described embodiments, and many modifications may be made within the technical concept of the present invention. The advantages described in the embodiments of the present invention are only a list of some of the most desirable advantages of the present invention, and the advantages of the present invention are not restricted to those stated in the embodiments of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-166393, filed Aug. 26, 2015, which is hereby incorporated by reference herein in its entirety.

What is claimed is:

1. A lens array, comprising:
a plurality of lenses configured to form a plurality of light spots by collecting test light that has been divided,
wherein each lens has
a lens member, and
a light shielding member provided corresponding to an inner region of the lens member including a perimeter edge portion thereof, the light shielding member shielding a part of the light and transmitting a part of the light,
and wherein the light shielding member is formed to satisfy the following expression $$\left| \frac{\Delta_i + \sum_{j=2}^{N} \Delta_j \exp\left(i\frac{2\pi p}{\lambda f}\delta_j\right)}{\sum_{j=1}^{N} \Delta_j} \right| \leq 0.5$$

where p represents a layout pitch of the lenses, $\lambda$ represents a wavelength of the test light, f represents a focal length of the lenses, i represents an imaginary unit, N is an integer equal to or larger than 2, j is an integer from 2 to N, and $\Delta_1$ is an absolute value of an electric field transmission coefficient at the perimeter edge portion of each lens, the absolute value of the electric field transmission coefficient $\Delta_1$ increasing in a stepped manner from the perimeter edge portion of each lens toward the inner side thereof by an amount of change $\Delta_j$, at a position that is a distance $\delta_j$ inwards from the perimeter edge portion of each lens.

2. The lens array according to claim 1,
wherein the light shielding member is formed to satisfy the following expression $$\left| \frac{\Delta_i + \sum_{j=2}^{N} \Delta_j \exp\left(i\frac{2\pi p}{\lambda f}\delta_j\right)}{\sum_{j=1}^{N} \Delta_j} \right| \leq 0.3.$$

3. The lens array according to claim 1,
wherein the light shielding member is formed to satisfy the following expression $$\frac{0.55(j-1)\lambda f}{mp} \leq \delta_j \leq \frac{1.46(j-1)\lambda f}{mp}$$

where m is an integer 2 or larger and smaller than N.

4. The lens array according to claim 3,
wherein the light shielding member is formed to satisfy the following expression $$0.5 \leq \frac{m \sum_{j=1}^{\lfloor N+k/m \rfloor} \Delta_{mj-k}}{\sum_{i=1}^{N} \Delta_i} \leq 1.5$$

with regard to all integers k equal to 0 or larger but smaller than m.

5. The lens array according to claim 3,
wherein N≥3 holds.

6. The lens array according to claim 3,
wherein m=2 holds.

7. The lens array according to claim 6,
wherein $$N = \left\lfloor \frac{p^2}{\lambda f} \right\rfloor + 1$$

holds.

8. The lens array according to claim 6,
wherein N=2 holds.

9. The lens array according to claim 1,
wherein N≤20 holds.

10. The lens array according to claim 1,
wherein the light shielding member is a metal film formed on a surface of the lens member.

11. The lens array according to claim 10,
wherein, in each lens, the absolute value of the electric field transmission coefficient $\Delta_1$ is set by the film thickness of the light shielding member.

12. The lens array according to claim 1,
wherein the perimeter edge portion of each of the lenses is circular or polygonal.

13. A wavefront sensor comprising:
the lens array according to claim 1; and
an imaging device that is disposed facing the lens array,
wherein the imaging device is configured to take images of the plurality of spots.

14. A wavefront measurement apparatus comprising:
the wavefront sensor according to claim 13; and
a computing unit configured to calculate wavefront data of the test light, based on detection results by the wavefront sensor.

15. A shape measurement apparatus comprising:
the wavefront measurement apparatus according to claim 14;
a light source; and
an optical system configured to guide light from the light source to a subject, and to guide light reflected from the subject to the wavefront measurement apparatus as the test light,
wherein the computing unit calculates a shape of the subject based on the wavefront data.

16. An aberration measurement apparatus comprising:
the wavefront measurement apparatus according to claim 14;
a light source; and
an optical system configured to guide light from the light source to a subject, and to guide light transmitted through the subject to the wavefront measurement apparatus as the test light,
wherein the computing unit calculates an aberration of the subject based on the wavefront data.

17. A manufacturing method of an optical element, the method comprising:
processing a work to manufacture an optical element; and
measuring a shape of the optical element, using the shape measurement apparatus according to claim 15.

18. A manufacturing method of an optical element, the method comprising:
   processing a work to manufacture an optical element; and
   measuring an aberration of the optical element, using the aberration measurement apparatus according to claim 16.

19. A manufacturing method of an optical element, the method comprising:
   processing a work to manufacture an optical element;
   measuring a shape of the optical element, using the shape measurement apparatus according to claim 15; and
   measuring an aberration of the optical element, using the aberration measurement apparatus according to claim 16.

20. A manufacturing method of an optical device, the method comprising:
   manufacturing an optical device having an optical element; and
   measuring a wavefront of emitted light from the optical device, using the wavefront measurement apparatus according to claim 14.

* * * * *